June 4, 1940.  W. STROBRIDGE  2,203,422
APPARATUS FOR DRYING
Filed July 24, 1937   12 Sheets-Sheet 3

INVENTOR
William Strobridge
BY
Blair, Curtis, Dunne & Hayward
ATTORNEYS

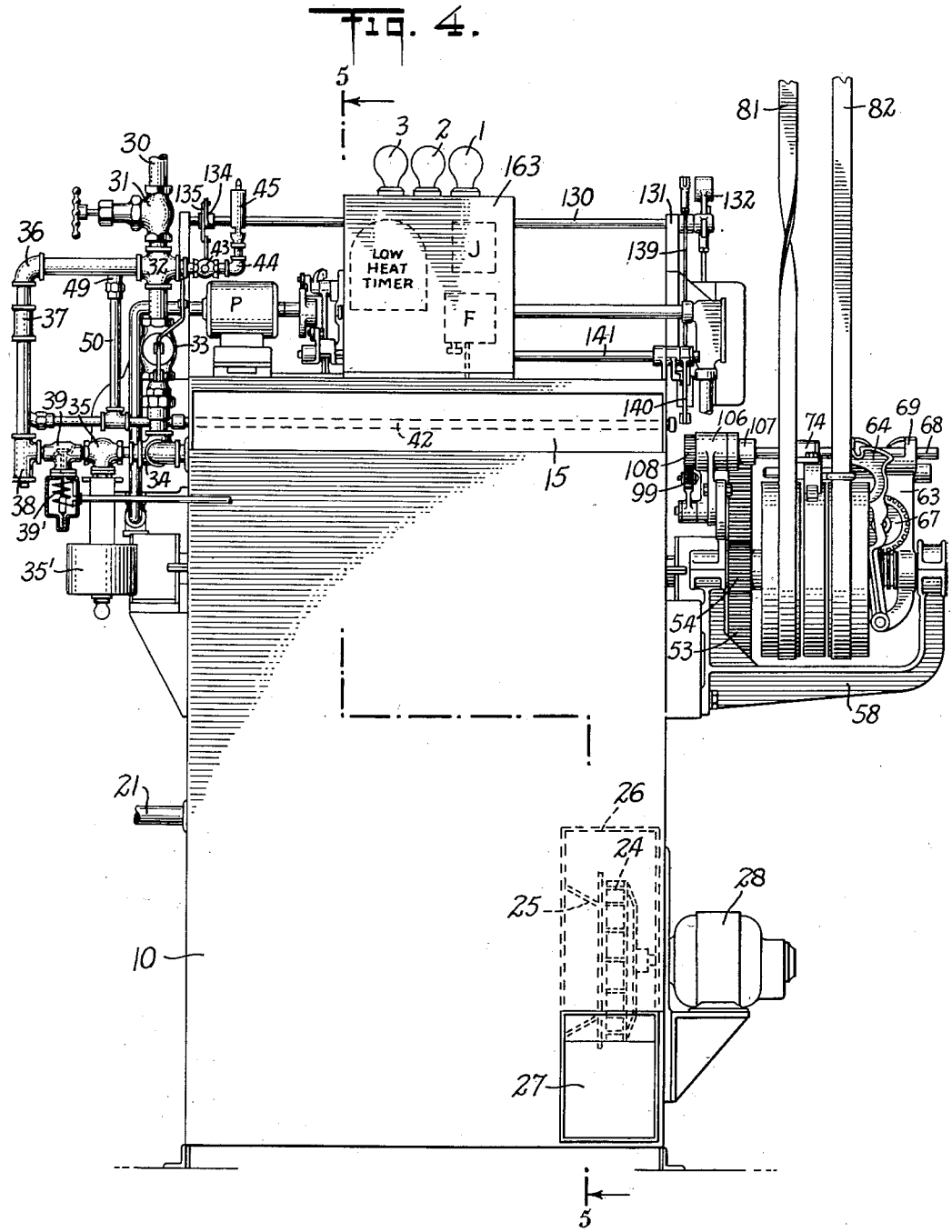

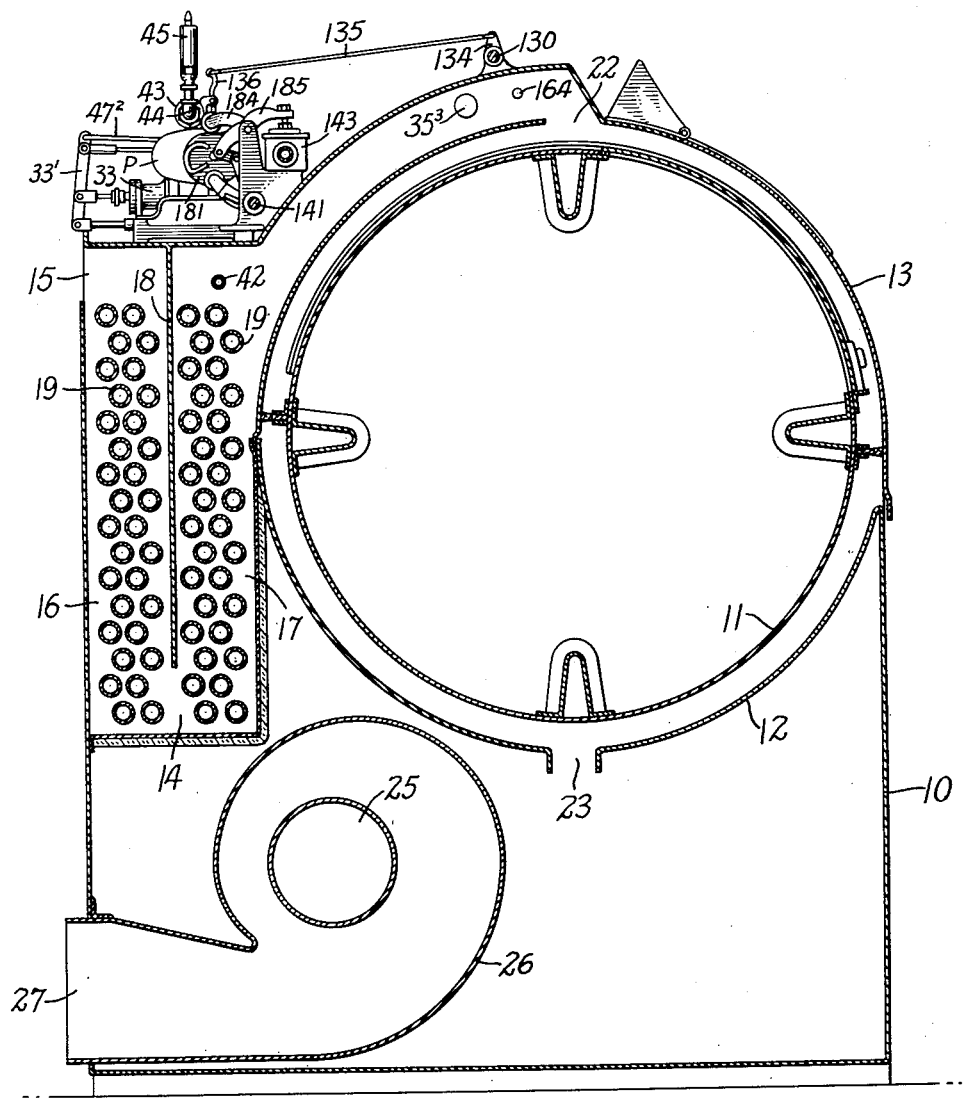

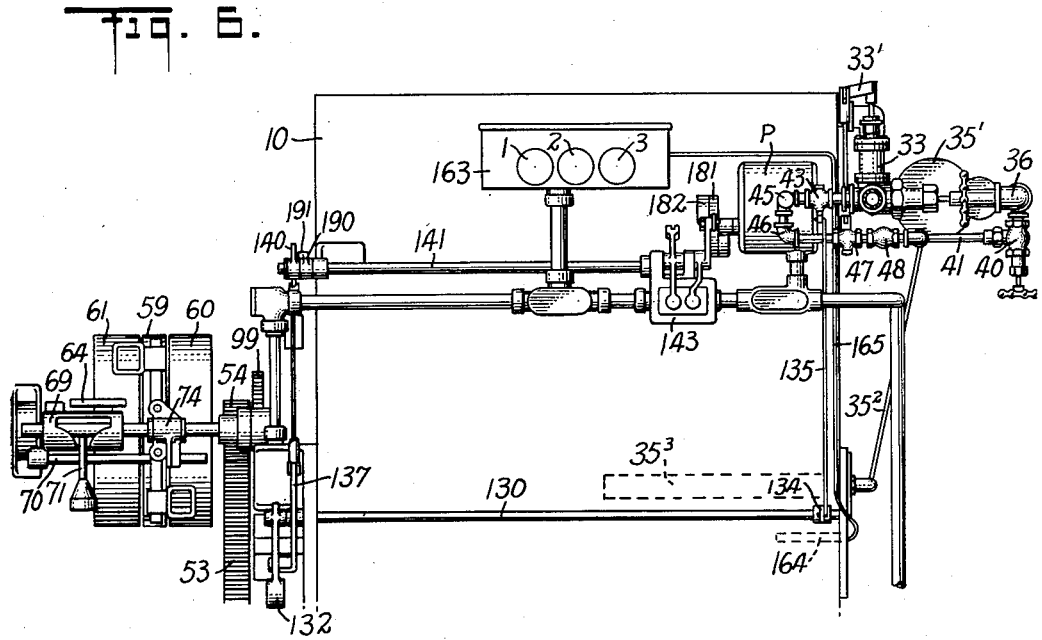
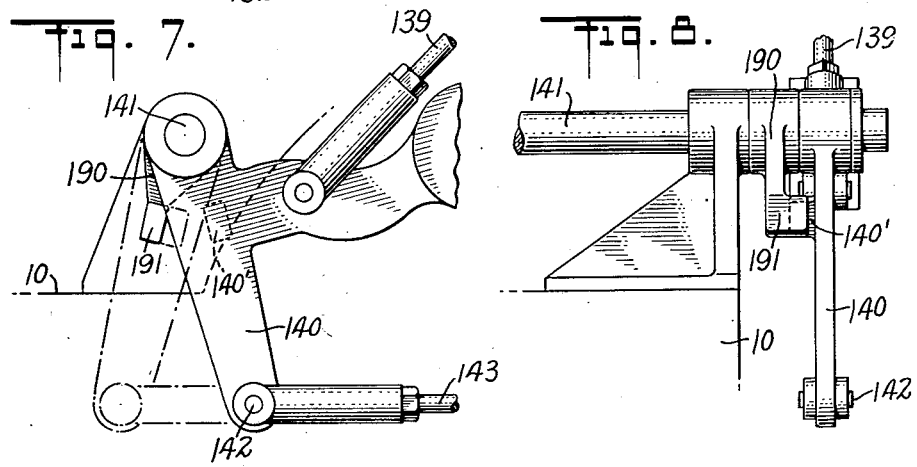
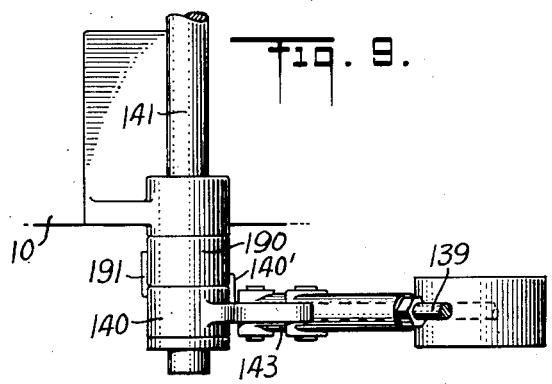

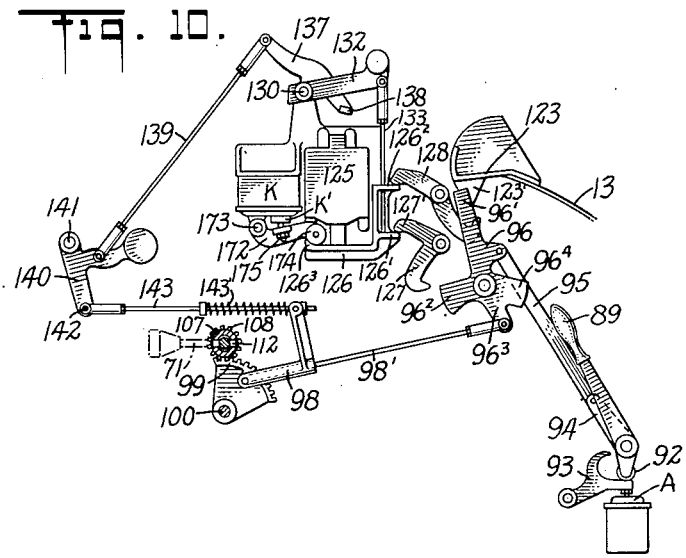
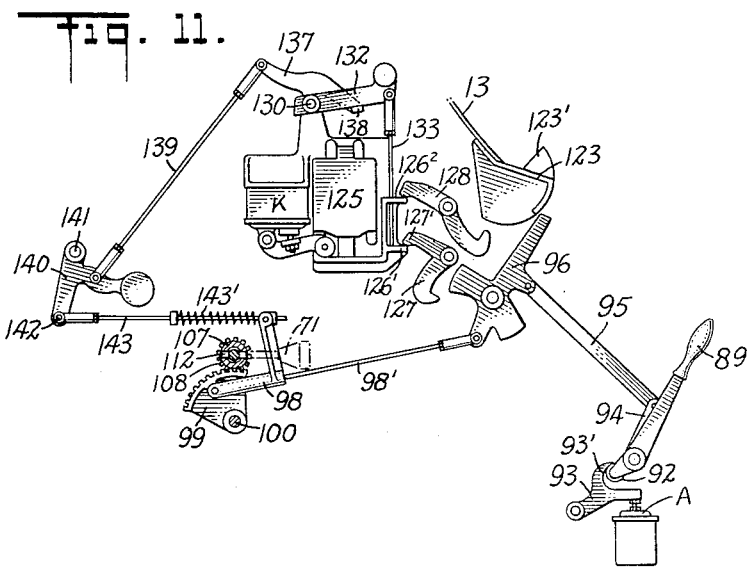

June 4, 1940.  W. STROBRIDGE  2,203,422
APPARATUS FOR DRYING
Filed July 24, 1937  12 Sheets-Sheet 8
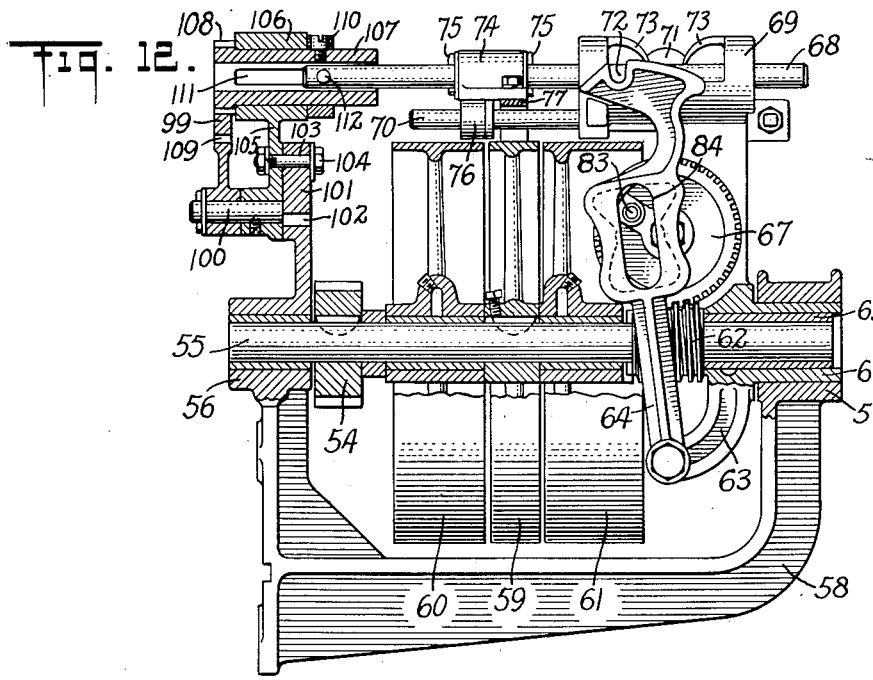
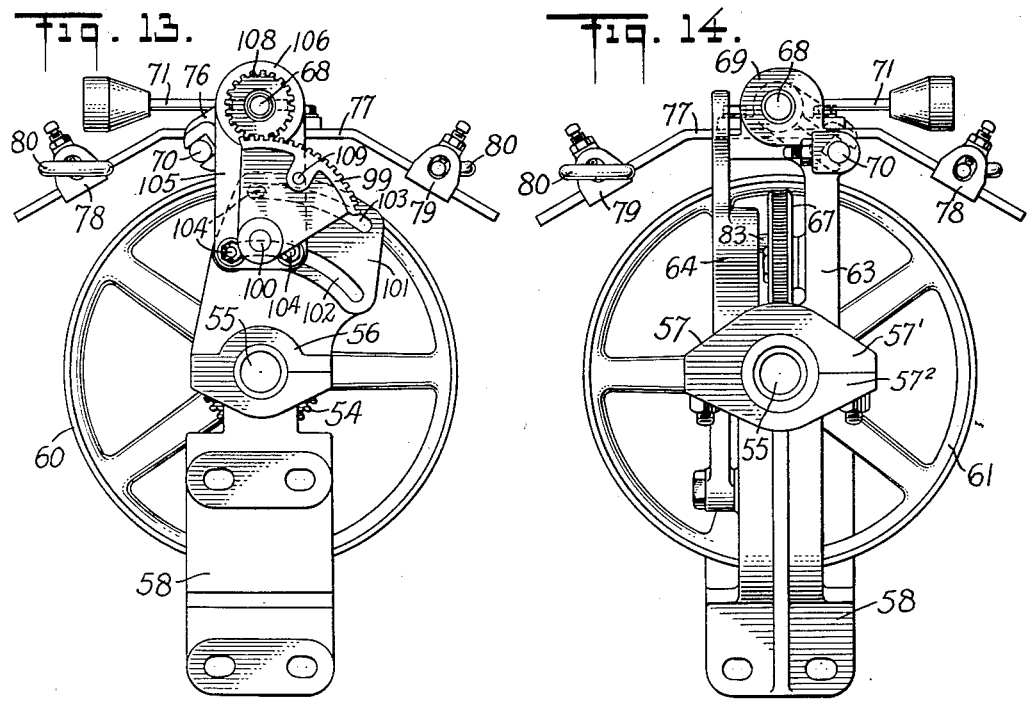
INVENTOR
William Strobridge
BY
Blair, Curtis, Dunne + Hayward
ATTORNEYS

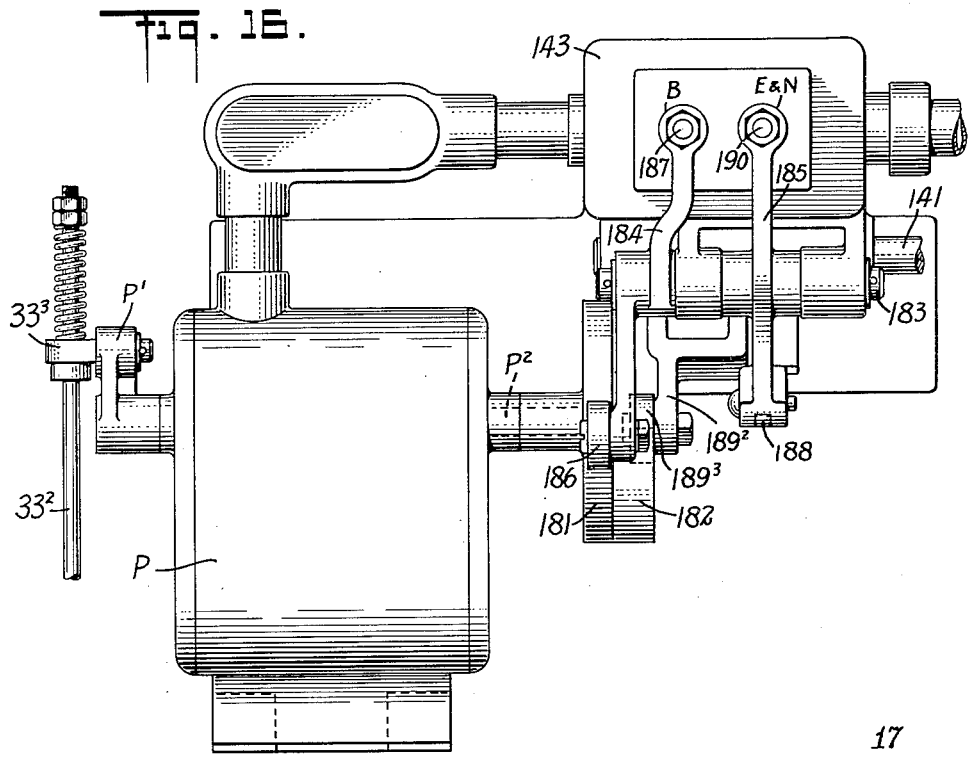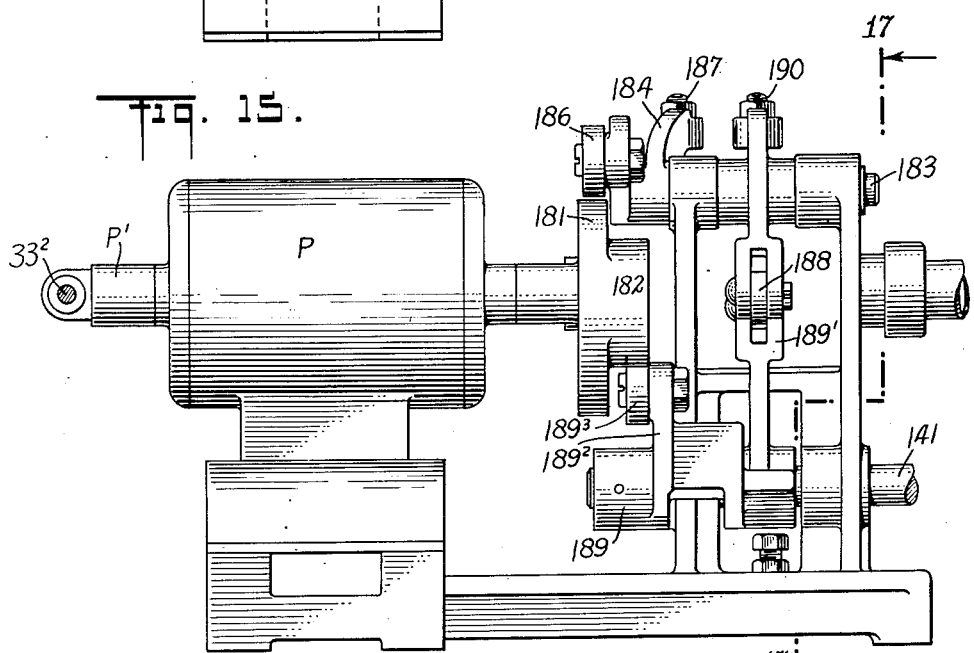

June 4, 1940.  W. STROBRIDGE  2,203,422
APPARATUS FOR DRYING
Filed July 24, 1937  12 Sheets-Sheet 10

INVENTOR
William Strobridge
BY
Blair, Curtis, Dunne & Hayward
ATTORNEYS

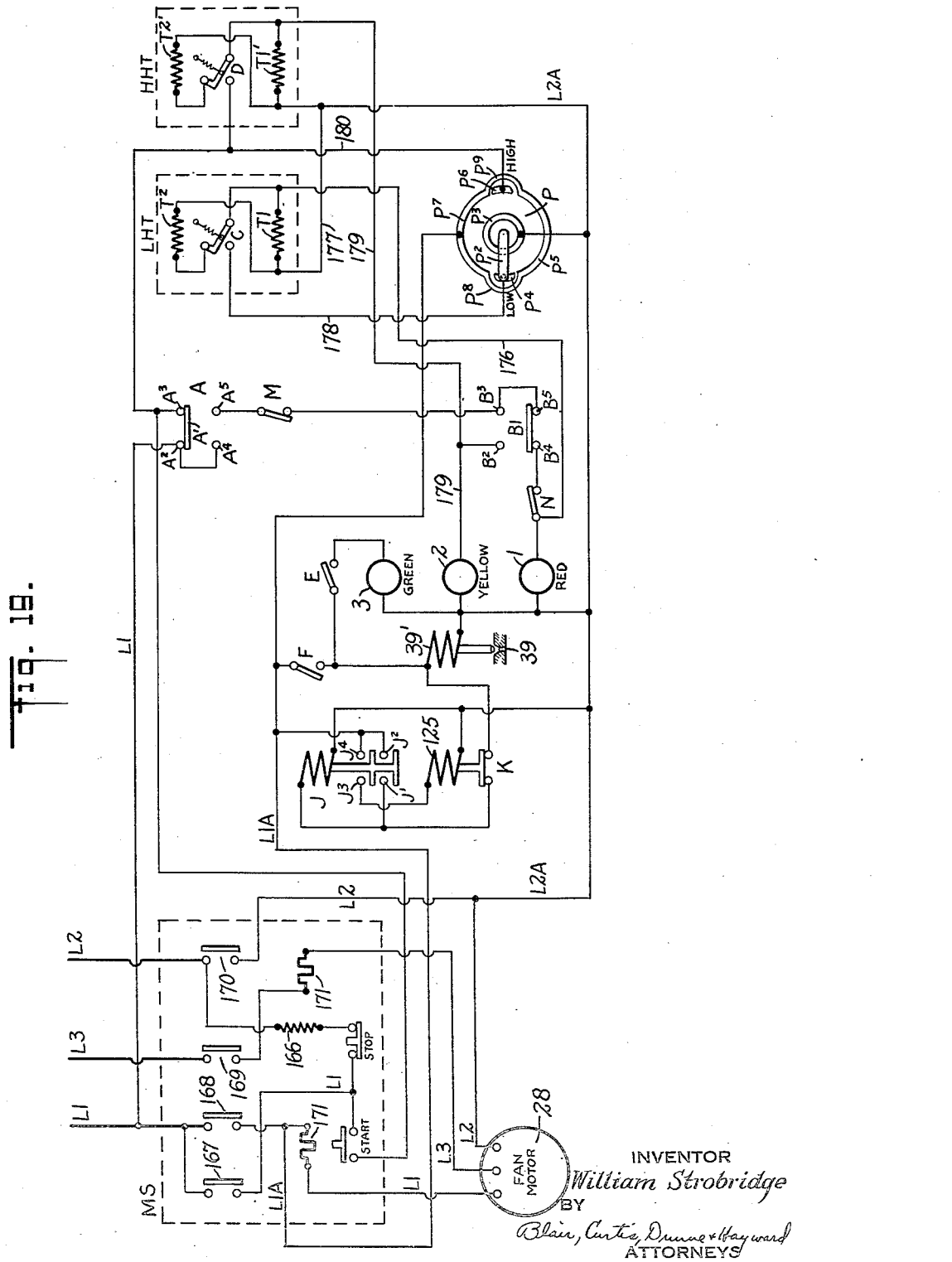

June 4, 1940.  W. STROBRIDGE  2,203,422
APPARATUS FOR DRYING
Filed July 24, 1937    12 Sheets—Sheet 12

INVENTOR
William Strobridge
BY
ATTORNEYS

Patented June 4, 1940

2,203,422

UNITED STATES PATENT OFFICE 2,203,422

APPARATUS FOR DRYING

William Strobridge, Syracuse, N. Y., assignor to United States Hoffman Machinery Corporation, New York, N. Y., a corporation of Delaware Application July 24, 1937, Serial No. 155,361

13 Claims. (Cl. 34—5)

This invention relates to apparatus useful in dry cleaning, and more particularly to apparatus for drying materials which have previously been treated with an inflammable cleaning solvent.

For many years Stoddard solvent, a mixture of petroleum distillates, having a flash-point in the neighborhood of 105° F., has had a wide use in dry cleaning processes, but since its flash-point is within the range of possible workroom temperatures, its use, and similarly, the use of solvents of lower flash-point, has been penalized in the sense that various statutes, ordinances, and rulings of fire insurance rate setting boards have required dry cleaning operations involving the use of such inflammable solvents to be carried on in separate or detached buildings of special construction.

Dry cleaning according to the open batch system usually includes handling a batch of clothing or other articles in successive stages, as follows: The batch is first treated in a washing machine, preferably of the horizontal cylinder type, by agitation in intimate contact with the solvent for a period of sufficient duration to accomplish the desired degree of cleansing. It is then rinsed in clean solvent, drained, and transferred to a centrifugal extractor where from 80% to 90% of the remaining solvent is drawn off. The clothing is then transferred to apparatus where it is dried and deodorized in a rotary drum through which heated air is drawn. The air is ordinarily heated by a set of steam coils over which the air passes on its way to the drum.

It will be understood that danger of explosion in the washer is extremely remote, since in such apparatus the air is not heated and attains such a high degree of solvent saturation that ignition is practically impossible under any likely conditions of operation. It is to be noted, however, that precautions are usually taken to prevent static electrical discharges. The operation of the centrifugal extractor is also substantially free from explosion risk.

The chief point of danger lies in the drying apparatus, for here, according to usual practice, highly heated air is brought into contact with the solvent under conditions likely to foster the accumulation of an explosive mixture. In the past, it has been known to attempt to remedy this danger by drawing the heated air rapidly through the dryer in the hope of keeping the air-vapor mixture below explosive concentration. But such methods as have been developed on this principle, although perhaps in some cases operative to reduce the danger somewhat, are in many respects defective and cannot be depended upon to lower the risk to the degree that safety demands. For example, after the beginning of the drying operation, while the clothing still contains an appreciable quantity of solvent, highly heated air might take up sufficient vapor to produce, if only for a brief period, an explosive mixture at or above the flash-point of the solvent.

In recent years other inflammable hydrocarbon solvents have become available for use by dry cleaners, having flash-points in the neighborhood of 140° F. and a distillation range from about 360° F. to 390° F. The danger inherent in the use of solvents such as Stoddard having flash-points commensurate with room temperatures is also present, to a lesser degree, with such relatively high flash-point solvents as those just mentioned, and unfortunately the advantages due to the superior solvent qualities and relatively high flash-points of such solvents are somewhat offset by their higher boiling points (relative to the low flash-point solvents hereinbefore discussed) necessitating, as they do, higher temperatures for accomplishing the complete drying and deodorization of the dry cleaned goods within an economically short period of time.

Heretofore drying apparatus has been devised for accomplishing with a high degree of safety drying operations where the batch to be dried had been treated with solvents having the characteristics of any or all of the inflammable solvents hereinbefore mentioned. Such apparatus was shown and described in an application for patent filed jointly by me and George E. Bowdoin, October 12, 1935, Serial No. 44,724 now matured into Patent No. 2,142,042, issued on Dec. 27, 1938. In the apparatus there referred to, the materials to be dried were first subjected to a flow of air maintained at a safe maximum temperature relative to the flash-point of the solvent used, for a predetermined interval of time for the removal of the greater part of the solvent, then subjected to a flow of air at a temperature or temperatures considerably higher than the flash-point for another predetermined interval of time, and, finally subjected again to a flow of air at a safe temperature relative to the flash-point, to cool and complete the deodorization of the materials and to bring the temperature within the dryer down to a point where the cycle of operation might immediately be repeated with safety.

It is an object of the present invention to provide apparatus of the nature described above, of improved construction and provided with improved automatic controls and interlocks for insuring the accomplishment of the drying cycle with maximum economy and safety. Further objects of the invention will be in part obvious and in part will be pointed out hereinafter.

The invention accordingly consists in the features of construction, combinations of elements, and arrangement of parts, as will be hereinafter described, and the scope of the application of which will be indicated in the following claims.

In the acompanying drawings in which is shown a preferred embodiment of the invention—

Fig. 4 is a rear elevation thereof;

Fig. 5 is a cross-section taken on line 5—5 of Fig. 4;

Fig. 6 is a top plan view of the rear portion of the tumbler showing the location of certain of the operating and control devices;

Fig. 7 is an enlarged detail left side elevation of a portion of a switch control device;

Fig. 8 is a rear elevation of the device shown in Fig. 7;

Fig. 9 is a top plan view of same;

Fig. 10 is a detached left side elevation of interlocking operating and control mechanisms shown in Fig. 3, the parts being in the positions they would occupy during operation of the dryer;

Fig. 11 is a view similar to Fig. 10 but with the parts differently conditioned both as regards the disclosure of Fig. 3 and the disclosure of Fig. 10;

Fig. 12 is in part a rear elevation and in part a longitudinal section on a larger scale of the belt pulley and belt shifting header assembly;

Fig. 13 is a left end elevation of the assembly shown in Fig. 12;

Fig. 14 is a right end elevation thereof;

Fig. 15 is an enlarged rear elevation of a half-turn motor and associated switch actuating mechanism;

Fig. 16 is a top plan view of the devices shown in Fig. 15;

Fig. 19 is a wiring diagram pertaining to the apparatus and devices shown in the preceding figures;

Similar reference characters refer to similar parts throughout the several views of the drawings.

Figure 1:
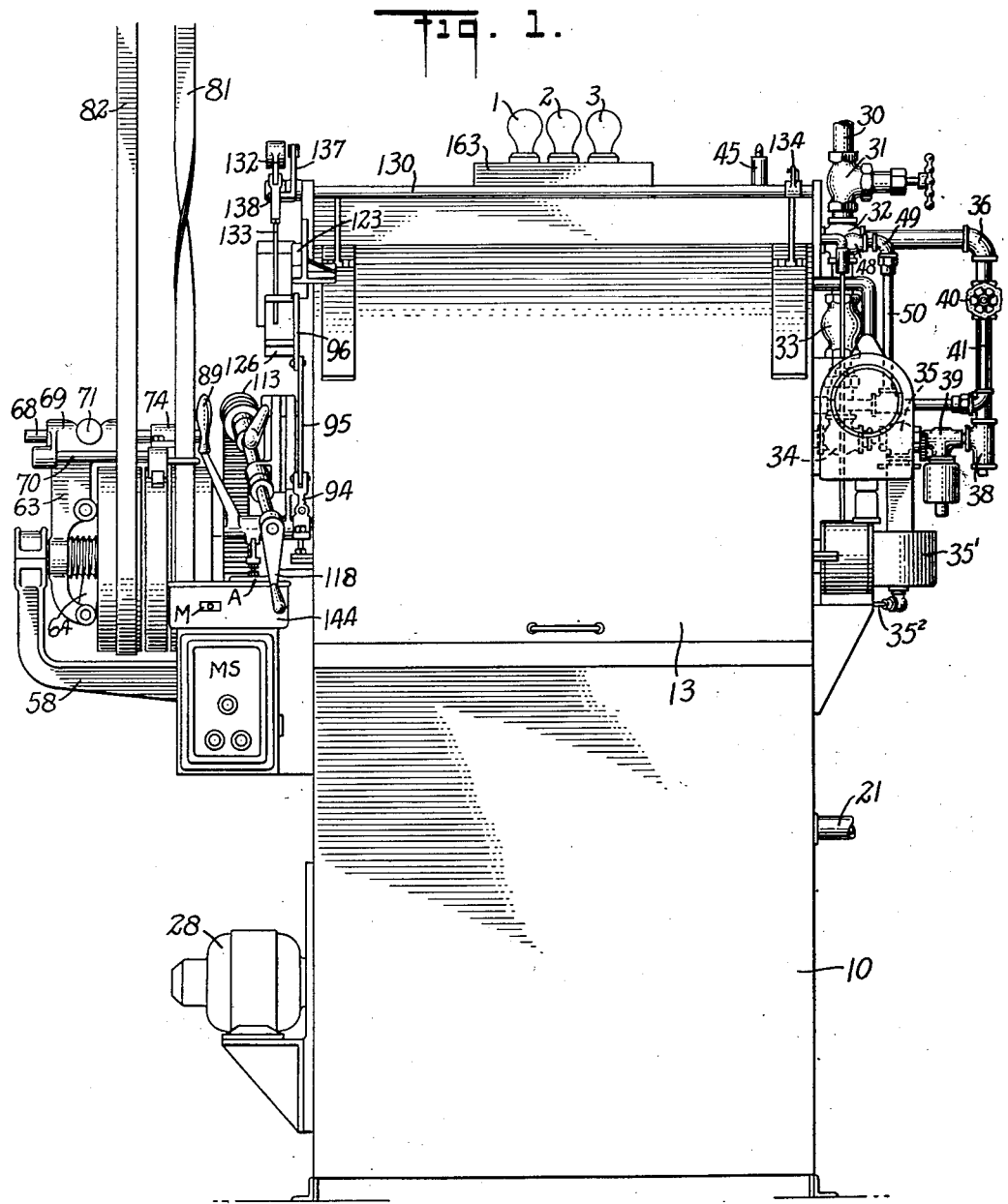
Fig. 1 is a front elevation of a drying tumbler embodying features of the present invention.

The apparatus and controls therefor may be modified to suit special conditions under which dry cleaning takes place without departing from the principles of this invention. Keeping in mind the fact that the treating of the clothes in the drying tumbler is first conducted at a temperature not exceeding a maximum predetermined in close relation to the flash-point of the particular solvent used in the preceding steps of the dry cleaning process, and that the length of this preliminary or low heat drying stage is determined by test as sufficient to dry the clothing to a degree making it possible and safe thereafter to submit the clothing in the drying tumbler to relatively high heat in order rapidly to complete the drying and effect efficient deodorization, it should be understood that in the case of a solvent having a flash-point substantially above any probable workroom temperature, as for example 140° F., the heat during the preliminary heating period may with safety be maintained at a temperature well above that of the workroom but not appreciably above the flash-point of the particular solvent used. It is good practice to select as a maximum temperature for this preliminary low heat stage a temperature slightly below flash-point. Under such conditions, there can be no danger of explosion taking place within the tumbler.

Drying apparatus for a solvent of this nature will include heating means and heat and time controls, adapted to heat the air entering the tumbler to the desired low heat drying temperature and maintain that temperature long enough to insure the removal of sufficient solvent from the tumbler to render impossible the accumulation of an air-vapor mixture at an explosive concentration.

Safe drying operation also requires the observance of certain fundamental precautions, as:

1. With the fan not running the radiation from the air heater must be insufficient to raise any solvent in the tumbler to a temperature above its flash-point.

2. The fan shall not be started unless the tumbler cylinder is at rest.

3. At no time during the drying cycle may the opening of the shell door be permitted, thus making it impossible, once the drying cycle has started, to introduce goods freshly laden with solvent into the tumbler and thus upset the control of the air-vapor mixture therein.

4. In the event of current failure and consequent stopping of the exhaust fan, the shell door of the tumbler must be locked closed and, should this occur during the high heat stage of operation, the interior of the tumbler should be flooded with steam. The shell door must remain in this locked condition until the temperature in the tumbler falls to the operating temperature for the low heat period and the fan is again in operation.

5. The drying cycle must not be permitted to start unless the temperature of the air entering the tumbler is below the flash-point of the solvent, if the safe low heat operating temperature is selected to meet this condition.

To meet the first of these conditions the coil box must be suitably insulated. The manner in which the other conditions for safety are met will be pointed out hereinafter.

*Description of apparatus*

Reference to Figs. 1 to 5 inclusive may be had for a general conception of the preferred form of apparatus. There is disclosed a tumbler comprising an outer shell or casing 10 having rotatably mounted therein a foraminous drum 11. The drum 11 is surrounded by an internal cylindrical shell 12 which encloses the drum for approximately three-quarters of the periphery thereof, the hinged outer shell door 13 at the front of the tumbler housing completing the enclosure. To the rear of the drum chamber is formed a rectangular coil box 14 connected with the atmosphere through the rear plate of the housing by means of an air inlet 15 giving access of air to the upper portion of the coil box.

The heater

Coil box 14 is divided into two compartments 16 and 17 by means of a vertical partition 18 which extends downwardly from the top plate of the coil box to within a short distance of the bottom thereof, the two compartments communicating, therefore, at their lower ends. Located in each compartment is a steam coil 19, the two coils being connected in parallel relation at their upper ends to the live steam supply as will be hereinafter described, and having outlets at their lower ends as indicated at 21, Figs. 2 and 4. Air from the inner compartment 17 is led to the top of the tumbler and admitted to the tumbler drum through an opening 22 in the inner shell 12. The air outlet from the drum chamber is through an opening 23 at the bottom of the shell 12, opposite the opening 22. The air thus passes into the lower part of the tumbler housing beneath the drum chamber, where there is located a centrifugal exhauster fan 24 having an air inlet 25 in its housing 26. The outlet of the fan housing is at 27 projecting through the rear wall of the tumbler housing.

The fan is driven preferably by a direct connected polyphase motor 28 and serves to draw air through the opening 15 over both coils 19, then through air inlet 22, down through the drum chamber, and by way of outlet 23 into the lower part of the tumbler housing where it is taken up by the fan and exhausted to the atmosphere.

Steam piping

The steam connections to the coils 19 may best be understood by reference to Figs. 1, 2, 4, 6 and 20. A 1" steam line 30 dropping down from above passes through a manually operated main shut-off valve 31 and then on below to a cross 32. Below the cross this main line runs through a lever operated valve 33 down to the upturned opening of a side outlet T 34. The inner or right end opening of the run of this T 34 connects by means of pipe 20 with the inner heating coil, while the side outlet of the same T connects with the outer heating coil through pipe 20'. The outer or left end opening on the run of T 34 is bushed down to ½" and connects with the outlet side of a thermostatically operated valve 35.

Going back to cross 32, a ½" line connects the outer or left end opening of the cross to an elbow 36 and then continues vertically downward into the run of a ½" T 37. Continuing down below T 37 the ½" line connects with a steam strainer 38. This strainer has a horizontally disposed opening from which a ½" line connects to the inlet side of the thermostatic valve 35 the outlet of which is, as stated above, connected to the steam coils 19. Interposed in the ½" line between the strainer and the thermostatic valve 35 is a solenoid actuated valve 39. Going back to the ½" T 37, its side branch or opening is connected to a ⅜" hand-operated angle valve 40 (see Figs. 6 and 20) the outlet of which connects by means of a ⅜" line indicated by the numeral 41 with a steam spray pipe 42 located in the upper part of the compartment 17 of coil box 15.

Figure 20:
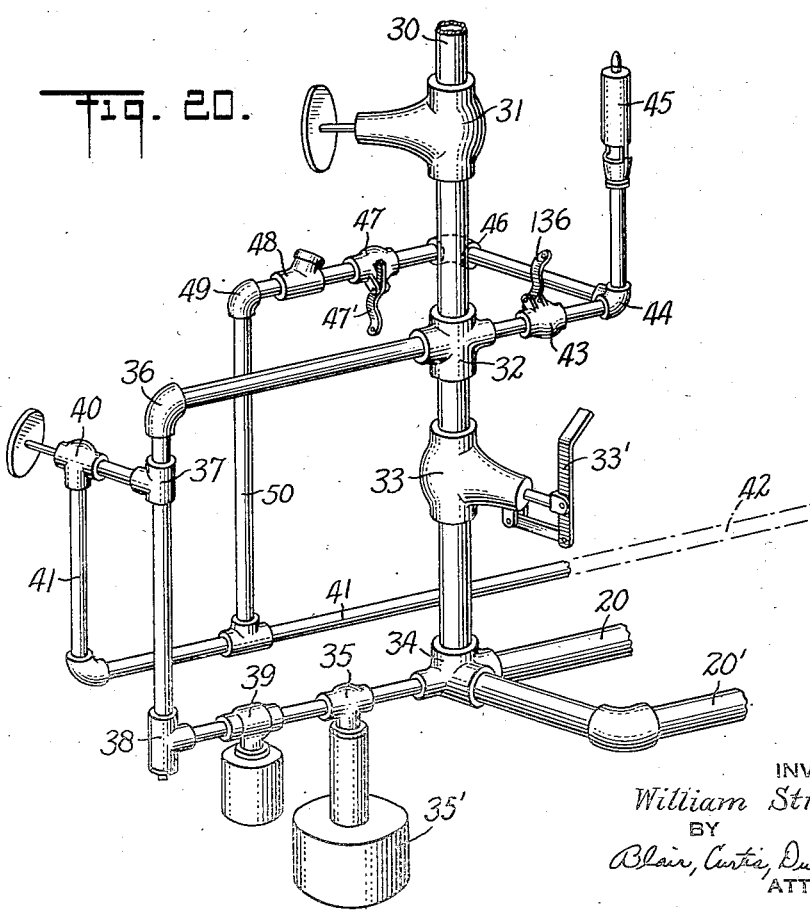
Fig. 20 is a diagrammatic isometric view of the steam piping and control valves associated with the apparatus.

Going back again to the 1" cross 32, it will be seen that the inner branch, that is, the right side of the cross as seen in Fig. 20, is reduced to ⅜" and connects by means of a horizontal nipple to a lever operated valve 43. Beyond the valve 43 this ⅜" line connects with a side outlet elbow 44 to the top of which is connected a steam whistle 45. From the side opening of elbow 44 the ⅜" line continues around through an elbow 46 and through another lever operated valve 47, after which the line continues to and through a check valve 48 and then by means of an elbow 49 and a pipe 50 drops down to make connection with the piping 41 leading to the spray pipe 42.

Figure 2:
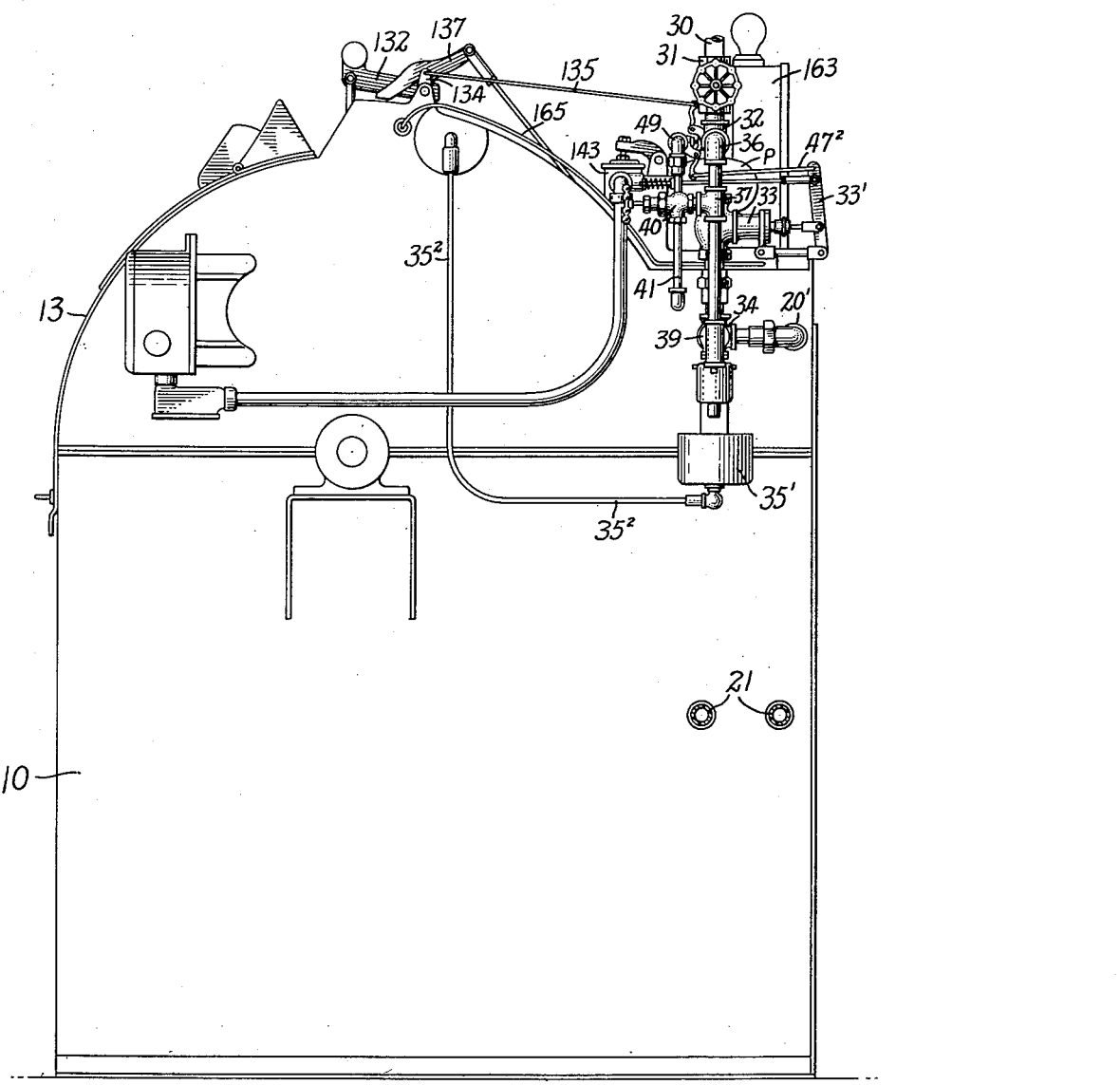
Fig. 2 is a right side elevation thereof.

Steam valve 33 in the main line to the heating coils is operated automatically by means of a lever $33^1$ connected by means of a link $33^2$ and spring connection $33^3$ with a crank $P^1$ mounted on the shaft $P^2$ of a half-turn motor P (see Figs. 4, 5, 6 and 18). Thus full steam to both coils 19 is controlled by operation of the half-turn motor. But as described above, a thermostatically controlled valve 35 also connects the coils 19, by means of a branch line connecting with the main steam supply at a point in advance of the valve 33. The diaphragm chamber $35^1$ of valve 35 is connected by means of tubing $35^2$ to a bulb $35^3$ located in the air space at the top of the tumbler between the inner and outer shells (Figs. 2 and 5). Thus the operation of the valve 35 is controlled by the temperature of the air at the top of the tumbler before it has access to the tumbler drum containing the materials to be dried.

Lever operated valve 47 is also under the control of the half-turn motor P by means of lever $47^1$ and rod $47^2$ which links with lever $33^1$ (see Fig. 18) and under certain conditions, as will be described later, permits steam to flow to the spray pipe within the tumbler.

Cylinder drive

The tumbler drum shaft $11^1$ is journaled in bearings 51 mounted on brackets 52 secured to the side plates of the tumbler housing. Upon the shaft $11^1$ is mounted a spur gear 53 driven by a pinion 54 mounted upon a jack-shaft 55 forming part of a pulley and belt shifting header assembly, for a better understanding of which reference is made to Figs. 12 to 14 in which the jack-shaft 55 is shown to be rotatably mounted in a pair of bearings 56, 57 carried by a header bracket or arm 58. This bracket is bolted to the side of the tumbler housing. The jack-shaft 55 carries a tight pulley 59 and a pair of loose pulleys 60, 61. Also loosely mounted upon the shaft 55 is a header worm 62 which has a pin-and-slot connection with the hub of the loose pulley 61 so as to be driven thereby.

Mounted upon the header bracket 58 in coaxial relation to the shaft 55 is a header arm assembly comprising the support 63, to which is pivotally connected the belt shifter fork 64. The shifter support 63 is actually mounted upon a sleeve 65 which surrounds the shaft 55 and extends into the bearing 57, support 63 having an extruded hub 66 which surrounds the sleeve 65 and also extends into the bearing. By this arrangement the header arm and supported mechanism may be swung around the shaft 55 to the angle best suited to the lead of the driving belts and then held securely in its adjusted position by drawing the halves $57^1$ and $57^2$ of the bearing 57 tightly together.

The header arm assembly includes a worm gear 67 on support 63 meshing with the worm 62, and a reciprocating slide shaft 68 slidably and rotatably mounted at the upper end of the support 63 in a block 69. Projecting from the block 69 parallel to the shaft 68 is a guide rod 70. A weighted pin or header fall 71 secured to and extending at right angles to the slide shaft 68 shifts with the slide shaft about its axis so that the pin 71 may engage the notch 72 formed in the upper end of the shifter fork 64 when the pin 71 is swung in one direction to a horizontal position, and when swung in the opposite direction to a horizontal position will be free of the shifter fork 64, but will engage one or the other of the beveled surfaces 73 formed on the block 69 and ride down to a neutral position. Mounted loosely upon the slide shaft 68 in a position between the block 69 and the tumbler housing is a shifter sleeve 74. This sleeve is held against endwise movement upon the slide shaft by any suitable means such as the cotter pins 75. This sleeve carries a forked arm 76 cooperating with the guide rod 70 to prevent the shifter sleeve 74 from rocking about the axis of the shaft 68. The shifter sleeve also carries a shifter arm 77 extending in opposite directions above the belt pulleys and provided with belt guide blocks 78 and 79, each equipped with a belt guide 80.

The belt guides are so disposed that when the shifter pin 71 occupies its center or neutral position, the two drive belts 81, 82 (see Figs. 1 and 4) will be positioned upon the loose pulleys so that under these conditions no power will be transmitted to the tumbler drum. It will be noted that the belt 82 is direct and the belt 81 crossed whereby the shifting of one belt off and the other belt on to the tight pulley will effect a reversal of the rotation of the tumbler drum. It will be understood that belts 81 and 82 connect with a suitable line shaft (not shown).

The operation of the header assembly will now be briefly described. It will be noted that since the worm 62 is driven by the loose pulley 61 it will always rotate in the same direction irrespective of the location of the belts with respect to the tight pulley. Thus, also, the worm wheel 67 will rotate constantly in one direction. This wheel drives a crank-pin 83 slidable up and down in a slot 84 provided for that purpose in the shifter fork 64. This rotation of the loose pulley produces constant oscillation of the shifter fork at a slow rate of speed. When the pin 71 does not engage the notch 72 in the upper end of the shifter fork no motion will be transmitted to the belt guides, but when the pin 71 engages the notch 72 it will cause the slide shaft 68 to reciprocate slowly. This action will periodically shift the driving belts and reverse operation of the tumbler drum. No claim is made to this header construction per se but, as will be seen hereinafter, it is associated with other control mechanism to insure safe operation of the apparatus.

*Mechanical control mechanism*

Referring again to the drawings, mechanical means for setting the tumbler in operation to begin the drying cycle will now be described.

Figure 3:
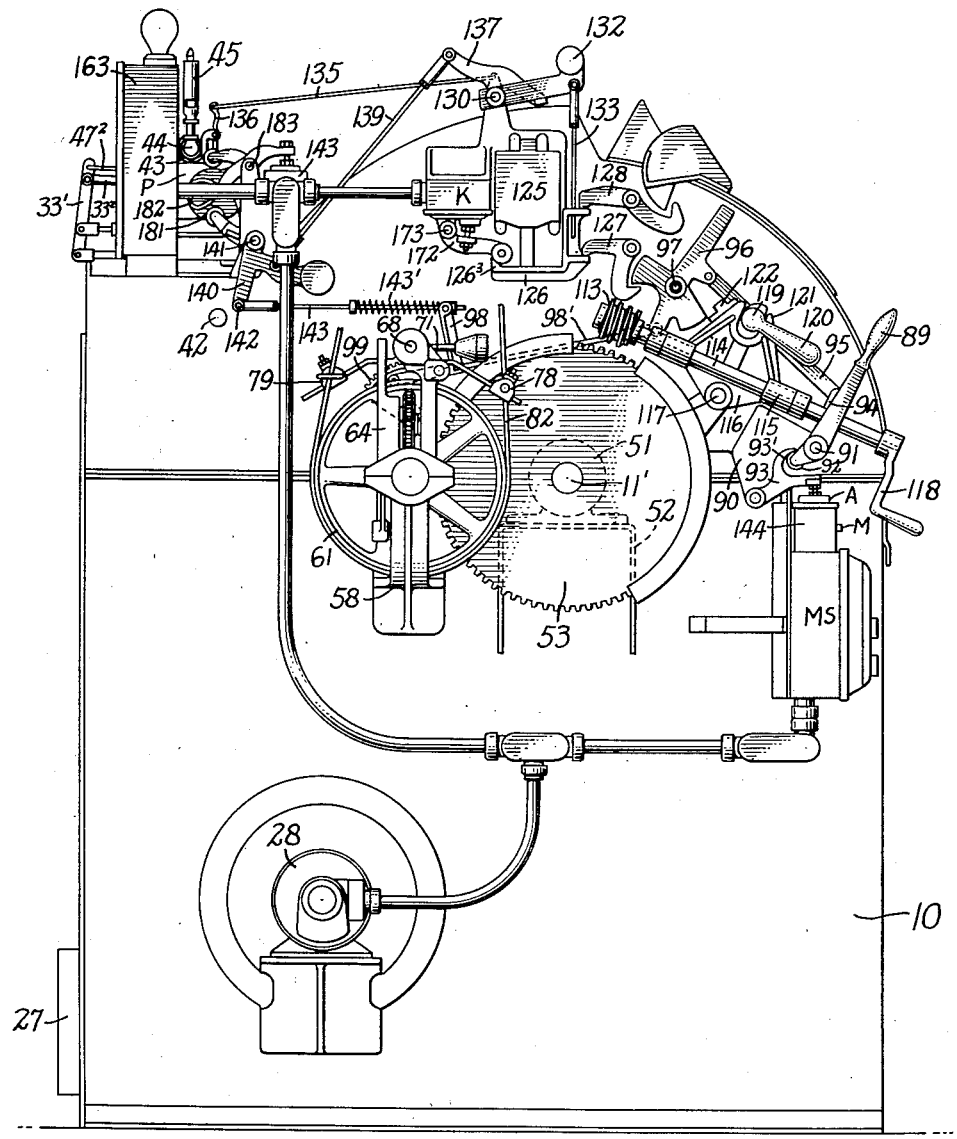
Fig. 3 is a left side elevation thereof.

In the positions of parts shown in Fig. 3, the condition of the apparatus is that which would obtain after a batch of material has been placed in the drum and the shell door closed. Under these conditions the shell door cannot be reopened or the header-fall brought into engagement with the shifter fork until after the exhauster fan has been started to make certain that there is an active flow of air through the tumbler. It may occur, at the start of a day's work, that the door will be closed and locked in the position shown in Fig. 3 when, as will be shown hereinafter, it will first be necessary to supply current to the fan before it is even possible to open the shell door for the loading of the drum. But if the door should be open prior to starting the fan, the drum may be loaded and thereafter the door closed, but no further operation can then take place until the fan has been started.

The means for shifting the header-fall into or out of engagement to cause belt drive of the tight pulley on the jack-shaft comprises an operating lever 89 which, with other operating parts, is mounted upon a cast bed-plate 90 bolted to the side sheet of the tumbler housing. Operating lever 89 is pinned to a shaft 91 rotatable in a bearing-forming part of the said bed-plate casting. Attached to one end of the operating lever is a roller 92 adapted, when the lever 89 is thrown to engage the belt shifting header-fall in operating position, to ride along a cam surface on a switch operating arm 93, moving said arm to shift a switch A, the purpose of which will be hereinafter explained. Operating arm 93 is further provided with a finger 93' which serves as an interlock to prevent unauthorized manual operation of the switch A when the lever 89 is in its disengaged position, as in Fig. 3.

Pinned to the shaft 91 in proper angular relation to the lever 89 is an arm 94, connected by a link 95 to a multiple interlock member 96 which is free to turn about a shaft 97 mounted in bed-plate casting 90. Interlock member 96 is provided with four radiating portions numbered respectively $96^1$, $96^2$, $96^3$ and $96^4$. Three of these projections serve strictly as mechanical interlocking elements. The other projection, namely $96^3$, is connected by an adjustable link 98' to an operating arm 98 pivotally connected to a gear segment 99 (see Figs. 10 to 13 inclusive) rotatably mounted on a pin 100 which is carried by a part of the header bracket 58 in the following manner.

Rising from the inner jack-shaft bearing 56 is a fixed bracket 101 which is provided with two arcuate slots 102 and 103. Mounted upon this fixed bracket by means of three bolts 104 is an adjustable bracket 105. The bolts 104 pass through the slots 102, 103 and thus permit the bracket to be adjusted radially about the header jack-shaft 55. The adjustable bracket 105 is provided with a seat for the pin 100 and also with a bearing 106 for the extruded hub 107 of a pinion 108. This pinion meshes with the gear segment 99 mounted as described above upon the pin 100. The gear segment is provided with a hole 109 by means of which the L-shaped operating arm 98 is attached thereto. The extruded hub 107 of pinion 108 is prevented from endwise movement by means of a set collar 110 and is provided with a coaxial bore through which the reciprocating shaft 68 is free to move. Portions of this extruded hub diametrically opposite each other are removed to form long slots 111 providing driving surfaces against a pin 112 fastened through shaft 68. Thus when the gear segment 99 is moved by the endwise shifting of the link 98' the resulting movement of pinion 108 and its extruded hub rotates shaft 68 by means of the pin 112 no matter at what point in its path of travel this pin is located.

This movement accomplishes the 180° throw of the header-fall 71 and is the means for initiating or terminating association of the tight pulley 59 with one or the other of the driving belts 81, 82 and thus the rotation of the tumbler cylinder. The reason for the adjustable mounting of the bracket 105 is so that it may be shifted to accommodate the position of the slide shaft 68 in accordance with the adjusted position of the shifter fork support 63. It will be understood then that when the operating lever 89 is thrown toward the center of the tumbler to the position shown in Fig. 10, the toggle composed of the members 94, 95 straightens out and causes rotation of the interlocking member 96 about its axis of rotation, causing the arm 96³ to assume the position shown in Fig. 10 thus rocking the gear segment 99 toward the front of the tumbler.

This motion of the gear segment causes rotation of the sleeve 107 and, because of the engagement of the pin 112 with the side of the slot 111, produces rotation of the shaft 68 in a counterclockwise direction, as looked at in Figs. 10 and 11, throwing the weighted header-pin or fall 71 from the position shown in Figs. 3 and 11 to that shown in Fig. 10 where it will engage the slot 72 in the shifter fork 64, thus, by reason of the slow reciprocation of the shaft 68, shifting one or the other of the driving belts on to the tight pulley 59 and causing rotation of the tumbler drum through pinion 54 and gear 53. It should be noted at this point that straightening the toggle 94, 95 locks the operating lever in the engaged position of the belt shifting header, thus insuring that the tumbler drum drive will continue until the starting lever 89 is returned to its forward or disengaged position.

As is customary with apparatus of this character, means is provided for "inching" the drum around so that the drum door and that of the shell may be brought opposite each other when the drum is not connected with its power drive. In the present construction, as best shown in Fig. 3, a worm 113 rigidly mounted upon a rotatable shaft 114 is mounted in bearings 115 which are carried by a bracket member 116 pivotally mounted at 117 upon the bed-plate casting 90. Upon the shaft 114 at the end opposite the worm 113 and at the front of the tumbler housing there is mounted a hand lever 118 by means of which the drum may be slowly turned about its axis when the worm 113 is lowered into engagement with the teeth of the spur gear 53. The movement of the worm toward and away from the gear 53 is accomplished by means of an eccentric member 119 having a handle 120. This eccentric member is positioned within a fork 121 formed in the upper end of the bracket 116. It will be readily understood that when the handle 120 is thrown upwardly and over toward the center of the tumbler, the bracket 116 will be rocked about its pivot until the worm engages the gear 53. The projection 96⁴ of interlock member 96 is provided to prevent accidental or unauthorized movement of the inching device into engagement with the gear 53 while the machine is in operation.

Mounted upon the bracket 116 is an abutment 122 which, when the parts are in the position shown in Fig. 3, is clear of the projection 96⁴ so that the worm 113 may be made to engage with the gear 53. However, in the position of the parts shown in Fig. 10, that is, when the operating lever 89 has been moved toward the center of the tumbler to bring the header-fall into its engaged position, the movement of the interlocking member 96 about its pivot will raise the projection 96⁴ into engagement with the abutment 122 thus preventing lowering of the worm 113 so long as the parts occupy this position. Conversely when the worm is in engagement with the gear 53 for hand rotation of the drum, it will be obvious that the operating lever 89 cannot be thrown into its header-engaged position. Thus there can never be any danger of injuring parts of the driving mechanism through engagement of the inching device with the drum while the drum is connected to its power drive.

*Safety devices associated with mechanical control mechanism*

There will now be described means connected with this operating mechansm for preventing the opening of the shell door 13 when the belt shifter header is engaged and also for preventing any actuation of the operating mechanism to start rotation of the drum when the shell door is open.

Referring to Figs. 3, 10 and 11, it will be seen that the interlocking member 96 is provided with the projection 96¹ as mentioned above which serves to form an interlock between the operating lever 89 and the shell door 13. This projection cooperates with a camlike abutment member 123 mounted to move about the axis of the shell door 13. With the lever 89 in the position it occupies in Figs. 3 and 11 there is no obstruction to the opening and closing of the door 13 due to projection 96¹, but it will be seen by reference to Fig. 11 that with the door open a portion of the abutment 123 lies in the path of projection 96¹ so that the operating lever cannot be thrown from the position it occupies in Fig. 3 to that shown in Fig. 10. Consequently the tumbler drum cannot be put into driven condition while the shell door remains open.

When the parts occupy the position shown in Fig. 10 with the shell door closed and the operating lever 89 in its header-engaged position, the projection 96¹ of the interlocking member lies in the path of another portion of the camlike abutment 123, making it impossible to open the shell door. This arrangement makes it impossible, once the drying cycle has started, to introduce goods freshly laden with solvent and thus upset the control of the air-vapor mixture within the tumbler, a very necessary safety precaution.

Now, since, as will be shown hereinafter, it is impossible that the starting lever 89 be put into engagement position unless current is being supplied to the fan motor, it follows that the dryer cylinder cannot be set in operation until after the fan is started.

*Safety devices operable upon failure of electric energy to the fan motor*

Supported upon the bed-plate 90 is a solenoid 125 to the core of which is attached a weight 126 of sufficient mass to cause the immediate descent of the solenoid core whenever excitation ceases. As will be more fully explained in connection with the wiring diagram shown in Fig. 19, this solenoid is energized under normal working conditions immediately after the closing of a magnetic starter, indicated in the drawings by the letters MS, whose position on the tumbler housing is substantially as disclosed in Figs. 1 and 3. It should be explained at this time that operation of the magnetic starter, among other things, starts the tumbler fan rotating; and that the solenoid 125 remains energized as long as the main switch in the magnetic starter remains closed or so long as failure of current in the fan circuit does not occur.

Pivotally mounted on the bed-plate 90 in operative relation to solenoid weight 126 and projection 96² of interlock member 96 is a latch 127 having an arm 127¹ maintained by gravity in engagement with a shoulder 126¹ on the solenoid weight 126 and having another hook-shaped arm adapted to cooperate with interlock 96² to prevent operating lever 89 being thrown to engaged position unless solenoid 125 has been energized which, as said above, can only occur if the tumbler fan is receiving current and the temperature of the air entering the tumbler from the heater is below a predetermined maximum. Thus it will be understood that latch 127 serves as an interlock against improper operation of the tumbler. When electric power is off, the solenoid 125 being deenergized permits the latch to swing into interlocking relationship with projection 96² so that if the operating lever 89 is in the disengaged position it will be impossible to throw it to the engaged position. Should it happen that the lever 89 be in engaged position and failure of current occur, the dropping of the solenoid weight will cause the latch hook to rest against the outer edge of projection 96² so that as lever 89 is thrown to disengaged position, as it must be to continue further drying operations, for reasons which will appear later, the latch hook dropping under projection 96² interlocks therewith and prevents further operation of lever 89 until current has been restored.

Also pivotally mounted on bed-plate 90 adjacent the solenoid is a latch 128 which functions only upon failure of current to prevent the opening of the shell door 13 until current has been restored which, as was pointed out above, can only be after the temperature of the air entering the tumbler from the heater falls below a predetermined maximum. Latch 128 cooperates at one end with a second shoulder 126² on solenoid weight 126 and at the other end is provided with a hook for interlocking action with a coacting abutment member 123¹ movable with the member 123 about the door hinge axis. When current fails, the dropping of the solenoid core which has been holding latch 128 out of engagement with door member 123¹ now permits latch 128 to swing under the action of gravity so as to interlock with the door member and prevent opening the door until current is restored. This latch never serves to prevent closing the door.

Thus it will be understood that irrespective of the period in the drying cycle that current failure occurs, the drying tumbler will be put out of operation and/or held out of operation until after current is once more flowing in the fan circuit. It will be seen later, in connection with the wiring diagram and the operation of the apparatus, in what manner the fan is energized concurrently with excitation of the solenoid 125 and so becomes operative before operating lever 89 can be moved in the header-engaged position.

Other safety elements related to the solenoid 125 are a switch K whose function will be described later, and a rock-shaft 130 (see Figs. 4, 10 and 11). This rock-shaft extends along the top of the tumbler housing and has bearings indicated at 131 upon either side thereof. Upon the left side of the machine as shown in Fig. 3, this shaft carries a weighted lever 132. Pivotally connected to and depending from lever 132 is an adjustable push rod 133 which extends downwardly to such a point in relation to the shoulder 126¹ on solenoid weight 126 that, when the solenoid core is raised, the rock-shaft 130 will be rocked in counter-clockwise direction as seen in Fig. 3 and, when solenoid weight 126 drops through deenergization of the solenoid, weighted lever 132 will descend to a lower position, turning the rock-shaft in the clockwise direction. Adjacent its opposite end the rock-shaft 130 supports a crank 134 which is connected by means of a link 135 with the lever 136 for operating valve 43.

As will be remembered valve 43, when open, admits steam to the whistle 45 and under certain conditions also admits steam to the spray tube 42. It will be sufficient to say here that whenever the solenoid is energized the valve 43 is closed so that steam cannot reach either the whistle 45 or the spray tube 42 and that, when the solenoid is deenergized and the operating lever 89 is in its header-engaged position, the valve 43 will be open admitting steam to the whistle 45 and, under certain conditions associated with the operation of the half-turn motor, will also admit steam to the spray tube and the interior of the tumbler. As will be shown later, means is provided to prevent a deenergized condition of the solenoid rendering it possible for valve 43 to be open when the operating lever 89 is in its disengaged position.

The operation of the apparatus will presently be made plain by reference to the wiring diagram of Fig. 19. For the purposes of this description of the mode of operation, it will be assumed that there has been employed in the predrying stages of the dry cleaning operation a solvent having a flash-point slightly above 140° F., the temperature selected for carrying out the low heat stage of the dryer operation during which from 60% to 70% of the solvent remaining in the clothes after centrifugal extraction is evaporated and driven off from the batch in the dryer drum. A high heat period and a cooling period have been mentioned and have been found to be advantageous in carrying out the principles of the invention, but it should be borne in mind that variations of these stages of operation may be made without departing from the scope of the invention, since a more important consideration is this, that so long as there remains in the batch sufficient solvent to form an explosive mixture the dryer is incapable of operating at any temperature above the predetermined safe maximum relative to the flash-point of the solvent used. Referring to Fig. 19, there will be found various control devices such as electrically operated timers, signal lamps, a magnetic switch contactor, a magnetic valve, and certain other switches not hereinbefore mentioned.

The magnetic starter MS has been mentioned, as have the half-turn motor P and the single pole, double throw switch A which is operated by the operating lever 89. In addition to these control elements there is a single pole, double throw switch B which is operated by the half-turn motor concurrently with the operation by said motor of the main steam valve 33. It will be understood that the half-turn motor operates first to terminate the low heat period of operation, and operates again to terminate the high heat period of operation. After its second operation the half-turn motor will have returned to its initial position and be in condition to control the operations of a succeeding drying cycle. The electrical connections to the half-turn motor are completed at the end of the low heat period through the operation of a low heat timer designated LHT, and the second operation to terminate the high heat period is controlled by a high heat timer designated HHT.

Half-turn motor

Mention has been made above of the half-turn motor P. This is a standard motor of a well-known type whose operation is controlled by a commutator switch rotatable synchronously with the motor. This switch (see Fig. 19) comprises a commutator ring P3 connected to one side of the power line; an outer commutator concentric with P3 comprising four alternating short and long segments P4, P5, P6 and P7, segments P5 and P7 being in fact integral, as they are connected by conductors P8 and P9; and a rotatable brush P2 rotated in synchronism with the motor. As will appear more clearly later, segments P4, P5, P6 and P7 are successively connected under predetermined conditions of tumbler operation and at predetermined intervals of time with the other side of the above-mentioned power line. The connections to the short segments P4 and P6 are completed respectively by switches C and D of the low- and high-heat-timers. When the live line is brought to P4 a half-revolution of the motor is initiated and similarly when the live line is brought to P6 another half-revolution is initiated. As soon as the brush P2 rides off of P4 or P6 onto P5 or P7, the excitation of the motor for the remainder of the respective half-turn is maintained through those segments. The motor will stop when its brush rides off of P5 or P7 onto the short segments P6 or P4.

The timers

Figure 21:
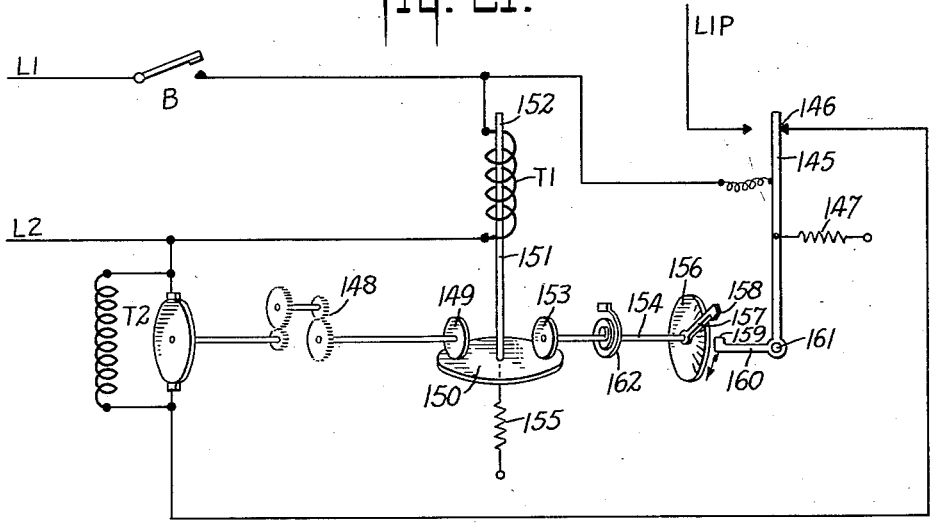
Fig. 21 is a diagrammatic view of a timing device.

Timers LHT and HHT control respectively switches C and D in the half-turn motor circuits. Since these timers are alike, the following description will suffice for an understanding of the construction and operation of both. Referring to Fig. 21, a timer will be seen to comprise a motor T2 connected in shunt to power lines L1, L2, through a movable switch member 145 normally held in engagement with a fixed contact 146 by means of a spring 147. The shunt motor circuit will thus normally energize the motor whenever a switch B in line L1 is closed. The rotor of the motor is connected by means of suitable gearing 148 with a friction disc 149 adapted to be engaged by and to drive a friction disc 150. Disc 150 is fixed upon a shaft 151 forming an extension of the reciprocatory armature 152 of a magnet T1 which is connected in a circuit shunting the motor T2. When switch B is closed magnet T1 is energized and moves the friction disc 150 into mutual operative engagement with the disc 149 and a friction disc 153 fixed upon a shaft 154. A spring 155 tends normally to hold the disc 150 out of engagement with the discs 149 and 153 when the magnet T1 is unexcited. Shaft 154 drives a timing disc 156 which may be calibrated to indicate minutes.

Rotatable with the timing disc 156 is a hand 157 which may be adjustably positioned with respect to a zero position on the dial. At the end of the hand 157 is a lug 158, adapted at the zero position to engage a coacting lug 159 carried by an arm 160 rotatable with the switch arm 145 about the axis 161, against the tension of the spring 147. Moving the switch arm about its axis will break the motor circuit at 146 and make a connection between the line L1 and a conductor (in this figure designated L1P) which leads to the half-turn motor. This conductor corresponds with either wire 178 or wire 180 of Fig. 19, depending upon whether the timer occupies the LHT or HHT position.

The timing hand will be set back from the zero position on the dial a distance determined by the number of minutes for which the timer is desired to function. In operation, when switch B is closed, the motor starts to rotate and the magnet armature is drawn down to enable the motor to rotate the timing dial by means of the friction transmission connecting the motor shaft with timing shaft 154. Rotation of the timing dial will carry on until the circuit is broken at 146 by engagement of lug 158 with lug 159. Rotation of the timing dial also winds up a spring 162. When the motor circuit is broken at 146 the motor stops rotating, but the disc will not return to its original position until the magnet is deenergized by breaking the line circuit at B. When this is done the friction disc 150 is drawn out of engagement with discs 148 and 153 by the spring 155. Spring 162 then returns the timing dial and hand to their original positions and spring 147 returns the switch arm 145 into contact with switch contact 146. Thus the parts are reset to function all over again when next the switch B is closed.

Wiring diagram

Referring to Fig. 19, the wiring diagram will be seen to embrace various pieces of equipment heretofore mentioned. It comprises the magnetic starter MS which is a standard unit provided with overload and low voltage protection, the single pole double throw switch A mentioned above as associated in operation with the header operating lever 89, a single pole double throw switch B and two single pole single throw switches marked respectively E and N all operated by the half-turn motor, the two electric timers, the solenoid 125, the half-turn motor P, a thermostatic switch F which is controlled by the temperature of the air entering the tumbler from the heater, a magnetic contactor J interlocking certain circuits, a single pole single throw manually operated selector switch M, a single pole single throw switch K operated by solenoid 125, the magnetic steam valve 39 described above as being connected in the live steam line to the thermostatic valve 35, and three pilot lamps 1, 2 and 3 colored respectively red, yellow and green.

For economy in mechanical operation and wiring, switches B, E and N are enclosed in a single switch box 143, best seen in Fig. 5. Likewise, switches A and M are located in a single box 144 (see Figs. 1 and 3). Also three pieces of equipment, the low-heat-timer, magnetic contactor J and the thermostatic switch F, are located together within a suitable box 163 mounted upon the rear portion of the top of the tumbler housing. This box is equipped with a lock (not shown) since the low-heat-timer and thermostatic switch F are adjusted and set at the factory in accordance with the desired conditions of operation of the tumbler and it is important that thereafter they may not easily be tampered with. Mounted on top of this same box are the three pilot lights.

The thermostatic control switch F is operated by the usual bulb 164, located in the air passage leading from the heater to the interior of the tumbler housing in close proximity to the element $35^3$ which controls operation of valve 35. Tube 165 connects bulb 164 with switch F (see Figs. 5 and 6). The control of switch F should be such that the switch will close when the temperature in the air passage falls to substantially the temperature setting of valve 35 (140° if that has been selected as the low heat operating temperature).

Referring to the wiring diagram, L1, L2 and L3 indicate respectively the three legs of a three-phase power line entering the magnetic starter MS. It will be seen that line L1, at a point ahead of the magnetic starter, is connected by the switch contact arm A1 in the upper position thereof through switch contacts A2 and A3 to the starting button, marked "Start," of the magnetic starter. This connection only obtains when the header-engaging lever 89 stands in its forward or disengaged position. The momentary closing of the start switch completes a circuit through the normally closed stop switch ("Stop") through the actuating magnet coil 166 of the starter, which becoming energized closes the several switch contacts 167, 168, 169 and 170 and thereafter the magnet circuit is maintained through contacts 167, the stop switch, magnet coil 166, back to line L2. The three legs of the three-phase circuit are thus connected through to the three-phase fan motor. Two of these legs are protected with suitable thermal elements 171. Should the fan motor not start when the starter contacts are made, the thermal elements will heat up after a few seconds and open the main switch contact members.

When the fan starts, air will be drawn through the opening at the rear of the housing past the two sets of coils in the heater box, which at this time will be under the control of the thermostatic valve 35, into the tumbler drum chamber. It will be noted that the line L2 has a branch L2A and that a branch line L1A takes off from line L1 at a point beyond the magnetic starter contact 168. Thus besides the line L3 to the fan we have the lines L1 and L2 completing a circuit through the fan motor and, shunting this last circuit, a circuit L1A, L2A for supplying current to the various control devices hereinbefore mentioned. It will be seen that as soon as the main switch or contacts of the magnetic starter close, the line L1A becomes alive through one branch as far as the commutator segment P7 of the half-turn motor, through another branch as far as the thermostatic switch F, and through a third branch as far as the contacts J2 and J4 of the magnetic contactor J.

The switch F is normally held in an open position at temperatures above the selected temperature at which the apparatus is to operate during the low heat period, as, for instance, 140° F. If, at the beginning of a cycle, the temperature stands below or at 140° F., the switch F will be closed and a circuit will be completed from L1A through switch K, through the coil of the magnetic contactor J and back to line L2A. Thus, the magnetic contactor will be energized and, drawing up its core, will complete a circuit by way of switch contacts J3, J4 through the coil of solenoid 125 and will also complete a circuit by way of magnetic contact points J1, J2 through its own operating coil. Thus the solenoid 125 will become energized and by the raising of its core open the circuit through the switch K, so that thereafter the coil of the magnetic contactor J is maintained in an energized condition solely through the maintaining circuit including the contacts J1, J2.

Reference to Fig. 3 will show the switch K as located closely adjacent the solenoid 125 upon the side of the tumbler housing. The solenoid weight 126 is provided with a shoulder 126³ having a camming surface for engaging roller 174 carried by a lever 172 pivotally supported at 173 on the box of the switch K. This lever is provided with an adjustable bolt 175 adapted to engage the push button K1 of the normally closed switch K. This switch is merely a push button switch of a well-known type biased normally to closed circuit condition. When the solenoid is energized, the engagement of the adjustable bolt with the push button K1 opens the circuit through switch K and serves to prevent the lighting of the green pilot lamp until thermostatic switch F closes at the end of the third or cooling period of the drying cycle even though the switch E has been closed at the end of the high heat period as will be explained hereinafter. The deenergization of the solenoid from any cause whatsoever, by dropping the weight 126, permits movement of the lever 172 to effect closure of the switch K.

It will be remembered that with the solenoid 125 deenergized, operation of the header-engaging lever 89 to its header-engaged position is prevented by reason of the engagement of the latch 127 with interlock member 96². However, upon energization of solenoid 125 the interlock is removed and the header-engaging lever 89 released for manual actuation. Now by throwing the lever 89 to its header-engaged position the low heat stage of the drying cycle is begun.

*Low heat period of operation*

As previously explained, when the operating lever 89 is thrown to start the drying cycle, this operates switch A through roller 92 and operating arm 93 causing the contacts A2, A3 to be broken, and the contacts A4, A5 to be made. Thus a live circuit is established to the switch B if the selector switch M is closed. This selector switch M is, as noted above, located in the same switch box 144 with the switch A but is manually operated and is only opened when drying certain types of garments adversely affected by high temperatures. It will be readily understood that with the switch M open, the apparatus may be operated for an indefinite period of time under the conditions of the low heat period, that is, with the temperature maintained at the temperature for which the thermostatic valve 35 and the switch F are conditioned to operate.

Assuming, therefore, that the switch M is closed, the live circuit continues through contacts B4, B5 of switch B, through closed switch N to the low-heat-timer LHT by means of a line 176 and through the timer back to line L2A by means of wire 177. Thus the low-heat-timer is set in operation concurrently with the throwing of the operating lever 89. Simultaneously the red pilot lamp is connected in circuit to indicate that the apparatus is in its low heat stage of operation. Having established previously by test that the low heat period shall be, say, 10 minutes, after 10 minutes has elapsed from the throwing of the operating lever 89 switch C in the low-heat-timer is closed thus bringing the live circuit by means of wire 178 to the commutator segment P4 of the half-turn motor, and, as at this time the half-turn motor switch arm or brush P2 occupies the position shown in Fig. 19, the circuit will be completed through the half-turn motor to the line L2A.

The energization of the half-turn motor starts it upon its first half revolution, and as soon as the brush P2 passes from the segment P4 to the segment P5 the motor is connected directly in circuit with line L1A so that for the rest of its half revolution the motor is energized from L1A through the motor coils and back to L2A. At the end of the half revolution the brush moves off segment P5 on to segment P6 which at this time is not connected with the line L1. The half-turn motor accordingly stops at this point.

High heat period of operation

When the half-turn motor thus makes its half revolution it starts the high heat period of the drying cycle by opening valve 33 and admitting full steam to both heating coils of the tumbler. It also operates switch B in a manner to be hereinafter described. Thus the heating coils which up to this time have been under the control of the thermostatic valve 35 now receive their steam directly through the mechanically operated valve 33 in the main steam line and thus will receive full steam. The thermostatic valve will be closed by the higher temperature obtaining during this period, but it is not needed after the opening of the valve 33. When the half-turn motor operated to change from low heat to high heat period it operated switch B to break contacts B4, B5 and make contacts B2, B3.

When the live circuit through contacts B4, B5 was broken the magnet in the low-heat-timer was deenergized and, through spring action as above described, the timer was automatically reset to zero ready for the beginning of another cycle of operation. The wire 179 now being alive, current flows through the magnet T1¹ and motor T2¹ of the high-heat-timer HHT starting the latter to control the period of high heat operation. At the same time the yellow lamp is lighted by the circuit through the wire 179 and back to L2A, the red pilot light having gone out in the meantime when contacts B4, B5 were broken. The high-heat-timer is located on the right side of the tumbler, as indicated, where it is within convenient reach of the operator. This timer differs from the low-heat-timer in that it is provided with external means for quick manual adjustment of the time setting. It has been found necessary with different types of textiles to use different periods for the high heat, and since there is not the same need for maintaining a fixed adjustment of the high-heat-timer as there is in the case of the low-heat-timer, it is better to have the former located in a convenient position.

After a time, the determination of which has been established by test, has elapsed, switch D in the high-heat-timer is closed completing a circuit through wire 180 to contact P6 of the half-turn motor which is energized and makes a second half revolution back to its original position and in so doing closes the valve 33 thus cutting off steam to the two heating coils except by way of the thermostatic valve 35, thus restoring the steam control to the condition desired during the ensuing cooling period and at the beginning of the next drying cycle. This reversal of the half-turn motor from high heat to low heat is the beginning of the final or cooling period of the drying cycle. The second half revolution of the half-turn motor shifts the contact member B1 of switch B, breaks the circuit between B2 and B3 and reconnects contacts B4 and B5. Thus the high-heat-timer is deenergized and returns to zero position and the yellow lamp is cut out of circuit. During the high heat period of operation, the temperature of the air passing through the tumbler may be carried well above 200° F. because by this time only a small amount of solvent remains in the clothing and it is thus impossible to develop an explosive mixture in the dryer.

If for any reason the header-engaging lever 89 be thrown back to its disengaged position during the low heat period the low-heat-timer will immediately be thrown out of action and will return to its initial position. Also, if lever 89 be thrown to disengaged position during the high heat period, switch contact A1 by bridging contacts A2, A3 will connect segment P6 of the half-turn motor in circuit, since the wire 180 is connected with contact A3, and effect the return of the half-turn motor to its initial position, ready to start a new cycle. The high-heat-timer would then also return to its initial position through the shifting of switch contact B1. In either case the operator would have to wait until the temperature of the air entering the tumbler fell to the low heat operating temperature before he could again throw lever 89 to its engaged position.

Cooling period of operation

Under some conditions the cycle of operations might terminate here, but it has been found in practice that the time usually consumed to unload and reload the tumbler is insufficient to cool the tumbler to a temperature below the flash-point of the solvent, that is, below the maximum temperature established for the low heat period. It has been found desirable, therefore, in order to secure complete safety, to introduce a cooling period immediately succeeding the high heat period in order that the temperature of the air entering the dryer may reduce to the temperature setting of the thermostatic switch F and steam valve 35. When the cooling period was started by the return of the half-turn motor to its original position and the operation of switch B to the position it occupied at the beginning of the low heat period, this movement of the half-turn motor also operated switches E and N, closing switch E and opening switch N. The manner in which these switches E and N are operated by the half-turn motor will be described in connection with the description of the operation of switch B by the same means.

The opening of the switch N at the end of the high heat period was necessary to prevent relighting the red lamp and starting the low-heat-timer functioning during the cooling period. During the cooling period a reduction of the temperature of the air entering the drum takes place, since the seam coils are then under the control of the thermostatic valve 35. When the temperature is lowered to the setting of the thermostatic switch F (e. g. 140° F.) this switch closes and there is a circuit completed from L1A through switch F, through switch E (closed at end of high heat period), through the green lamp to line L2A.

The lighting of the green lamp indicates to the operator the end of the cooling period and of the drying cycle. The operator now, in order to remove the load, must throw the operating lever 89 to its header-disengaged position. When this occurs, as will be explained later, switch E is opened and switch N is closed, thus making the circuit ready for beginning the low heat period of the next drying cycle.

For an understanding of the way in which the switches B, E and N are actuated by the half-turn motor, reference should be made to Figs. 3, 15, 16 and 17 of the drawings. These figures show all of the parts in the positions which they will occupy at the beginning of a drying cycle. Mounted on the right-hand extension of the half-turn motor shaft P2, as seen in Fig. 16, is a composite cam comprising camming surfaces 181 and 182. Mounted on a shaft 183 suitably supported in the framework of the half-turn motor assembly are two operating arms 184 and 185. Operating arm 184 at one end is equipped with a roller 186 contacting cam 181, and at the other end with an adjustable stud 187 contacting a push button of the switch B located in the multiple switch box 143.

Operating arm 185 is connected at one end by means of a link 188 with one arm 189¹ of a rocker member 189 which is pinned to a shaft 141 extending across the top of the tumbler housing, and the other end of operating arm 185 is provided with an adjustable stud 190 for operating both of the switches E and N in the multiple switch box 143. Further description of these switches is unnecessary, other than to say that they are normally biased to the positions shown in Fig. 19, E open and N closed. The second arm 189² of rocker 189 carries a roller 189³ for cooperation with cam 182. Both of the operating arms 184 and 185 are free to turn on shaft 183. Shaft 141 is suitably supported above the rear end of the tumbler housing in parallel relation to rock-shaft 130. Fixed to this shaft adjacent the half-turn motor is the rocker 189 and at its far end, overhanging the other side of the tumbler is provided a fixed operating arm 190 provided with a lug 191 which under certain conditions of operation engages a corresponding lug 140' carried by a counterweight arm 140, which is loosely mounted upon the shaft 141 (see Figs. 7, 8 and 9). Arm 140 is connected by a rod 143 and a compression spring 143' to the L-shaped gear segment operating arm 98 which, as previously described, connects directly with the gear segment 99 of the belt shifter header mechanism and by means of a train of connections with operating lever 89.

Figure 17:
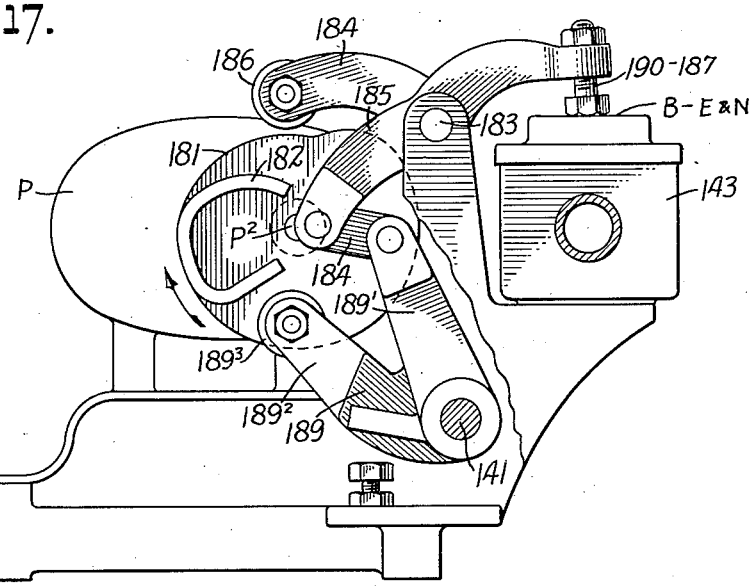
Fig. 17 is a right end elevation of the same devices.
Figure 18:
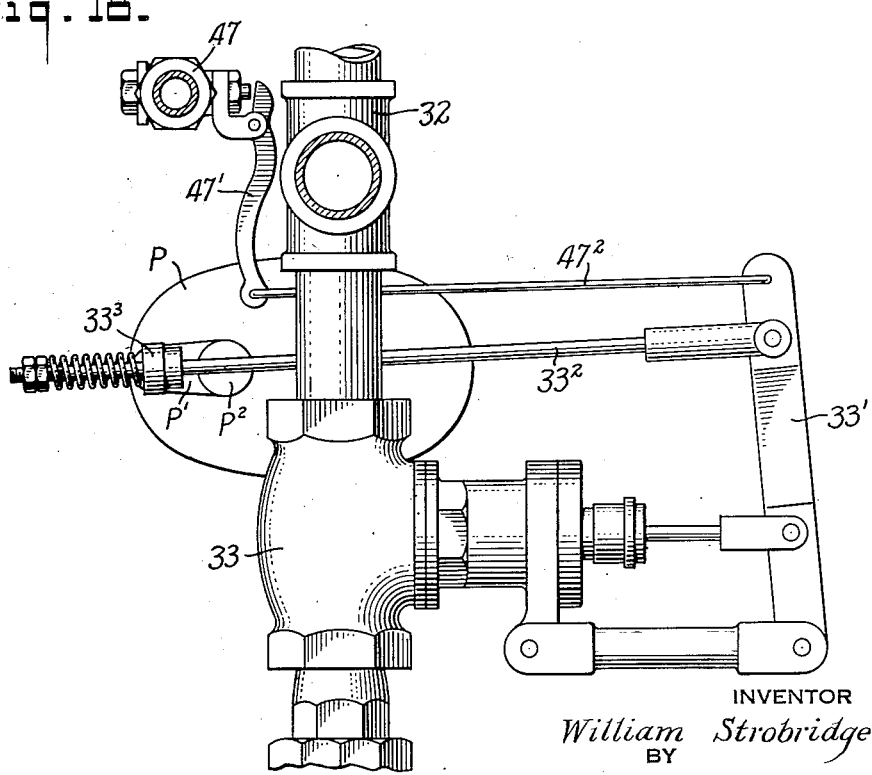
Fig. 18 is a left end elevation of the half-turn motor showing certain valve actuating mechanism operated thereby.

As shown in Figs. 15 to 17, the roller 186 of arm 184 is at the low point of cam 181 while roller 189³ of rocker 189 is shown in the position to which it was driven at the end of the preceding cycle. When at the end of the low heat period, the half-turn motor makes its first half-revolution in a clockwise direction, as seen in Fig. 17, cam 181 elevates roller 186 and depresses the other end of the operating arm 184 thus depressing the button of switch B and changing the switch from its low heat position to its high heat position.

During this movement of the half-turn motor the positions of switches E and N are not affected since, during this half-revolution, cam 182 does not engage cam roller 189³, but moves 180° from the position shown in Fig. 17. When the half-turn motor makes its second half-revolution to change the tumbler from the condition for high heat to the condition for cooling, these results follows: Roller 186 on operating arm 184 drops off the high portion of the cam 181 permitting the restoration of switch B to its original position with contacts B4, B5 made and contacts B2, B3 broken. At the same time cam 182 engages roller 189³ on operating arm 189² and straightens the toggle formed by arm 189¹ and link 188 so that operating arm 185 is rocked to depress the button which operates switches E and N and the parts are locked in this position by the straightened toggle.

This second half-revolution accomplished by the half-turn motor leaves the switch operating end of lever 184 up and the corresponding end of lever 185 down, and this condition continues throughout the cooling period of the drying cycle. Now at the end of the cooling period when the green pilot lamp lights, the operator pulls the operating lever 89 to its disengaged position. When this occurs, the arm 140 is moved in a clockwise direction as viewed in Fig. 7 by the rearward thrust of rod 143 and the lug 140' on this arm engages lug 191 on arm 190 carrying said arm back to its original position. This rocks shaft 141 in a clockwise direction and effects a rocking movement of rocker arm 189¹. This breaks the toggle formed by arm 189¹ and link 188 and elevates operating arm 185 so that switches E and N are restored to their original positions in which switch E is open and switch N is closed.

In the operation of the tumbler the main shut-off valve 31 is manually operated and is used only to turn on or shut off the steam supply to the tumbler. The lever operated valve 33 and lever operated valve 47 are opened by the half-turn motor every time the automatic drying cycle changes from low heat to high heat conditions, and are closed again when the half-turn motor is called upon to change the tumbler operation from high heat to cooling stage. The thermostatic valve 35 is on the live steam supply as long as the main shut-off valve 31 is open but admits only enough steam to the two heating coils in the tumbler to maintain the heat of the air entering the tumbler at the selected low heat operating temperature.

During the high heat period of the drying cycle when valve 33 is open and admitting full steam supply to both heating coils, the temperature of the air entering the tumbler is, of course, high enough to keep the thermostatic valve 35 closed and this valve is provided with overheating protection to stand this periodic elevation of temperature.

The two lever operated valves 47 and 43 have functions connected only with the failure of electric current supply to the exhauster fan. Such a failure of current, as previously noted, deenergizes solenoid 125. The dropping of solenoid weight 126 causes counterweight arm 132 to drop, turning shaft 130 and opening valve 43 for the purpose of admitting steam inside the tumbler through the spray pipe 42. However, if such current failure occurs during the low heat or cooling periods of the drying cycle, it is unnecessary to flood the tumbler with steam since during these periods the temperature is safely controlled in relation to the flash-point of the solvent. But it is desirable to have some audible alarm to notify the operator that current has failed and for this reason valve 43 is opened to admit steam to the whistle 45.

Under the arrangement just described it will be realized that unless special provision were made the steam whistle 45 would likewise sound when first putting the tumbler into operation if the operator opened main steam valve 31 before starting his fan motor and energizing solenoid 125. As an operator would be likely to turn on the steam to the tumbler before starting his fan, this sounding of the whistle would be a nuisance, which can be entirely eliminated by the mechanism now to be described, reference being made to Figs. 3, 10 and 11.

Freely mounted on shaft 130 is a lever 137, one end of which is provided with a laterally extending lug 138 underlying counterweight arm 132. The other end of lever 137 is connected by a rod 139 to the above mentioned switch restoring counterweight arm 140. When the operating lever 89 is in its forward or disengaged position the lug 138 on lever 137 holds the counterweight arm 132 in its elevated position. Since the dropping of this arm 132 causes the opening of valve 43 supplying steam to the alarm whistle 45, it is obvious that the whistle cannot be sounded so long as the operating lever 89 stands in its disengaged position.

When the operating lever 89 is thrown to the engaged position the lever 137 is moved to the position shown in Fig. 10. Since the operating arm 89 cannot be thrown to the engaged position unless the fan motor has first been started and solenoid 125 energized, it follows that counterweight arm 132 will remain in its elevated position after operating arm 89 has been shifted to start tumbler operation and lug 138 has been drawn away from arm 132. However, if current failure should then occur the consequent dropping of the solenoid core would permit the descent of weighted arm 132, automatically effecting opening of valve 43 and operation of the steam whistle. This mechanism has the further advantage, that sounding of the whistle may be terminated immediately by throwing the operating lever from engaged to disengaged position. This is desirable in the event of current failure to the fan since it stops revolution of the tumbler cylinder. The fact that the solenoid has been deenergized by reason of the current failure will, as previously described, prevent the opening of the shell door or the throwing of the lever 89 again to engaged position until current has been restored and the temperature of the air entering the cylinder has fallen to the predetermined maximum operating temperature for the low heat period.

By mechanically connecting valve 47 with the half-turn motor, this valve will open only when the drying cycle changes from low heat to high heat stage. A current failure during the high heat period will, therefore, blow the whistle and at the same time flood the tumbler with steam since both valves 43 and 47 are open. When this contingency develops the operator may throw the operating lever 89 to disengaged position to stop cylinder rotation, thus shutting off the steam whistle and stopping the admission of steam to the interior of the tumbler. Should the current failure be of sufficient duration, main steam valve 31 may be closed.

It should be noted that angle valve 40 is included in the piping system only as a manual means for admitting live steam to the tumbler at the beginning of the operating cycle. This is done to make the operation of the tumbler conform, if found desirable, to a long established practice of some cleaners in admitting live steam for a few moments at the beginning of the operating cycle to prevent the accumulation of an abnormal amount of static charge, a condition which might develop when drying such material as silk, particularly in cold weather. The spray pipe with its automatic control serves only for flooding the tumbler with steam in the event of current failure during the high heat period of the operating cycle, but has no part in the normal operating cycle of the tumbler.

An additional safety device which has been briefly mentioned above is the solenoid actuated valve 39 indicated diagrammatically in the wiring diagram, Fig. 19, and its position in the piping scheme is clearly shown in Fig. 20. As thus indicated diagrammatically in Fig. 19 and also in Fig. 4, this valve is of the normally closed type and is adapted to move to its open position when its operating solenoid coil $39^1$ is energized. This coil receives current when the thermostatic switch F is closed and current is flowing in the fan circuit from the power lines L1, L2. In other words, the solenoid valve 39 is energized and held open under the same conditions that the solenoid 125 is energized to permit operation of the drying tumbler through its drying cycle. This valve is provided as an additional safety means insuring that temperatures in the cylinder will not rise above the selected maximum during the low heat period in the event that the thermostatic valve 35 fails to seat tightly under the conditions for which it is set to operate, or in any other manner proves defective. In operation, as long as the thermostatic switch remains closed, which occurs normally throughout the low heat period of the operating cycle, the solenoid operated valve will be energized to open and thus admit steam to the inlet of the thermostatic valve 35. Should, however, the thermostatic valve fail in any way, the increase in temperature in the heating coils occasioned by leakage of steam past the thermostatic valve will eventually effect the opening of the thermostatic switch F, thus deenergizing the coil of the solenoid operated valve and cutting off steam from the thermostatic valve 35.

As many possible embodiments may be made of the above invention without departing from the scope thereof, it is to be understood that all matter herein set forth or shown in the accompanying drawings is to be interpreted as illustrative and not in a limiting sense.

I claim:

1. In apparatus of the character described, in combination, a drying tumbler housing having a door adapted to occupy open and closed positions and operable in a normal manner, an electric circuit including an electric fan for moving a current of air through said tumbler, and electric means interconnected with said circuit cooperative with said door in said normal manner to prevent opening said door unless said circuit is in energized condition.

2. In apparatus of the character described, in combination, a tumbler housing, a rotatable cylinder in said housing, driving means for effecting rotation of said cylinder, control means for said driving means having engaged and disengaged positions and operable in a normal manner, an electric circuit including an electric fan for moving a current of air through said tumbler, and electric means interconnected with said circuit cooperative with said control means to prevent starting cylinder rotation in said normal manner unless said fan circuit is in energized condition.

3. In apparatus of the character described, in combination, a drying tumbler housing having a door adapted to occupy open and closed positions and operable in a normal manner, an electric circuit including an electric fan for moving a current of air through said tumbler, electric means interconnected with said circuit cooperative with said door in said normal manner to prevent opening said door unless said fan circuit is in energized condition, means for heating said air current, and thermostatic means adapted to prevent operation of said interconnected means unless the temperature of said air current is below a predetermined maximum.

4. In apparatus of the character described, in combination, a tumbler housing, a rotatable cylinder in said housing, driving means for effecting rotation of said cylinder, control means for said driving means having engaged and disengaged positions and operable in a normal manner, an electric circuit including an electric fan for moving a current of air through said tumbler, electric means interconnected with said circuit cooperative with said cylinder control means to prevent starting cylinder rotation in said normal manner unless said fan circuit is in energized condition, means for heating said air current, and thermostatic means adapted to prevent operation of said interconnected means unless the temperature of said air current is below a predetermined maximum.

5. In apparatus of the character described, in combination, a drying tumbler, an electric circuit including an electric fan for moving a current of air through said tumbler, means adapted to flood the interior of said tumbler with steam, and electric means interconnected with said circuit adapted automatically to render said flooding means operative upon failure of energy in said circuit.

6. In apparatus of the character described, in combination, a tumbler housing, a rotatable cylinder in said housing, driving means for effecting rotation of said cylinder, control means for said driving means having engaged and disengaged positions, an electric circuit including an electric fan for moving a current of air through said tumbler, means adapted to flood the interior of said tumbler with steam, electric means interconnected with said circuit adapted to render said flooding means automatically operative upon failure of energy in said circuit, and means associated with said control means adapted to prevent automatic operation of said flooding means when said control means stands in its disengaged position.

7. In apparatus of the character described, in combination, a tumbler housing, a rotatable cylinder in said housing, driving means for effecting rotation of said cylinder, control means for said driving means having engaged and disengaged positions, an electric circuit including an electric fan for moving a current of air through said tumbler, means comprising steam coils for heating said air current, heat-sensitive means for controlling the admission of steam to said coils, and a time-controlled valve for admitting full steam periodically to said coils independently of said heat-sensitive means.

8. In apparatus of the character described, in combination, a tumbler housing, a rotatable cylinder in said housing, driving means for effecting rotation of said cylinder, control means for said driving means having engaged and disengaged positions, an electric circuit including an electric fan for moving a current of air through said tumbler, means adapted to flood the interior of said tumbler with steam, electric means interconnected with said circuit adapted to render said flooding means operative upon failure of energy in said circuit, means associated with said cylinder control means adapted to prevent operation of said flooding means when said control means stands in its disengaged position, means comprising steam coils for heating said air current, heat-sensitive means for controlling the admission of steam to said coils, a time-controlled valve for admitting full steam periodically to said coils independently of said heat-sensitive means, said flooding means being so related to said time-controlled valve as to admit steam to the interior of said tumbler only in the event that said valve is open to said coils when energy failure occurs.

9. In apparatus of the character described, in combination, a tumbler housing, a rotatable cylinder in said housing, driving means for effecting rotation of said cylinder, control means for said driving means having engaged and disengaged positions, an electric circuit including an electric fan for moving a current of air through said tumbler, means adapted to flood the interior of said tumbler with steam, electric means interconnected with said circuit adapted to render said flooding means operative upon failure of energy in said circuit, means comprising steam coils for heating said air current, heat-sensitive means for controlling the admission of steam to said coils, a time-controlled valve for admitting full steam periodically to said coils independently of said heat-sensitive means, said flooding means being so related to said time-controlled valve as to admit steam to the interior of said tumbler only in the event that said valve is open to said coils when energy failure occurs.

10. In apparatus of the character described, in combination, a drying tumbler, an electric circuit including an electric fan for moving a current of air through said tumbler, means comprising steam coils for heating said air current, heat-sensitive means for controlling the admission of steam to said coils for maintaining said air current below a predetermined maximum temperature, and electric means interconnected with said circuit adapted automatically to cut off steam to said coils should the heat-sensitive means fail to prevent a rise in temperature of said air current above said predetermined maximum.

11. In apparatus of the character described, in combination, a drying tumbler, an electric circuit including an electric fan for moving a current of air through said tumbler, means comprising steam coils for heating said air current, a steam supply for said coils, a spray pipe within said tumbler, a steam whistle, a valve operable to connect both said spray pipe and said whistle with said steam supply, and electric means interconnected with said circuit adapted automatically to render said valve operative upon failure of energy in said circuit.

12. In apparatus of the character described, in combination, a drying tumbler, an electric circuit including an electric fan for moving a current of air through said tumbler, means comprising steam coils for heating said air current, a steam supply for said coils, a spray pipe within said tumbler, a steam whistle, a valve operable to connect both said spray pipe and said whistle with said steam supply, electric means interconnected with said circuit adapted automatically to render said valve operative upon failure of energy in said circuit, heat-sensitive means for controlling admission of steam to said coils, a time-controlled valve for admitting full steam periodically to said coils independently of said heat-sensitive means, and a valve operable automatically to cut off steam from said spray pipe during periods when the time-controlled valve is closed.

13. In apparatus of the character described, in combination, a drying tumbler housing having a door adapted to occupy open and closed positions, an electric circuit including an electric fan for moving a current of air through said tumbler, normally inoperative means operable to obstruct movement of said door to its open position, and electric means interconnected with said circuit adapted to render said obstructing means effective in the event of a failure of current in said circuit.

WILLIAM STROBRIDGE.

CERTIFICATE OF CORRECTION.

Patent No. 2,203,422.  June 4, 1940.

WILLIAM STROBRIDGE.

It is hereby certified that error appears in the printed specification of the above numbered patent requiring correction as follows: Page 11, second column, lines 52 and 53, claim 1, and line 75, claim 3, strike out the words "in said normal manner" and insert the same after "door" in line 53, claim 1, and page 12, first column, line 1, claim 3 respectively; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.